US007584026B2

(12) United States Patent
Siemer et al.

(10) Patent No.: US 7,584,026 B2
(45) Date of Patent: Sep. 1, 2009

(54) WIRELESSLY CONTROLLED MOTORIZED VEHICLE SYSTEM

(75) Inventors: Edward D. Siemer, Oxford, NC (US); Ean D. Siemer, 885 Zan Ct., Cincinnati, OH (US) 45226; Timothy Jones, Richardson, TX (US); Srikanth Talia, Plano, TX (US)

(73) Assignees: Edward D. Siemer, Jr., Oxford, NC (US); Ean D. Siemer, Cincinnati, OH (US)

( * ) Notice: Subject to any disclaimer, the term of this patent is extended or adjusted under 35 U.S.C. 154(b) by 139 days.

(21) Appl. No.: 11/737,461

(22) Filed: Apr. 19, 2007

(65) Prior Publication Data

US 2007/0276572 A1 Nov. 29, 2007

Related U.S. Application Data

(60) Provisional application No. 60/793,312, filed on Apr. 19, 2006.

(51) Int. Cl.
*G05D 1/00* (2006.01)

(52) U.S. Cl. ............................... 701/2; 701/36; 701/67; 342/357.1; 455/557

(58) Field of Classification Search ..................... 701/1, 701/2, 36, 67; 455/554.2, 556.1, 557, 73; 342/357.1
See application file for complete search history.

(56) References Cited

U.S. PATENT DOCUMENTS 5,008,647 A 4/1991 Brunt
6,009,356 A 12/1999 Monroe
6,326,613 B1 12/2001 Heslin
6,356,812 B1 3/2002 Cragun
6,366,840 B1 4/2002 Buckley
6,408,232 B1 6/2002 Cannon
6,472,979 B2 10/2002 Schofield
6,629,032 B2 9/2003 Akiyama
6,662,642 B2 12/2003 Breed (Continued)

OTHER PUBLICATIONS

"Telephony Only the Beginning For Bluetooth in the Vehicle, Says ABI," http://www.bluetooth.com/news/index.asp?A=&PID=721, dated May 22, 2003, *Automotive Wireless Networks,* downloaded and printed on Apr. 27, 2004.

(Continued)

*Primary Examiner*—Gertrude Arthur Jeanglaud
(74) *Attorney, Agent, or Firm*—Frost Brown Todd LLC

(57) ABSTRACT

A wirelessly controlled motorized vehicle system may be utilized to facilitate operation of a motorized vehicle. The wirelessly controlled motorized vehicle system may comprise a motorized vehicle and a wireless communications system. The motorized vehicle may comprise a drive system operable to operate the motorized vehicle and a controller in communication with at least a portion of the drive system. The controller may be configured to receive a command from a user. The wireless communications system may be configured to allow wireless communication between the controller and the portion of the drive system. The wireless communications system may comprise one or more transmitters in communication with the controller and one or more receivers in communication with the portion of the drive system. Alternate embodiments may comprise a gauge and/or a central display unit in combination with one or more of the elements listed above.

39 Claims, 18 Drawing Sheets

U.S. PATENT DOCUMENTS

| | | | | |
|---|---|---|---|---|
| 2002/0027346 | A1 | 3/2002 | Breed | |
| 2002/0030592 | A1 | 3/2002 | Hakanen | |
| 2003/0191568 | A1 | 10/2003 | Breed | |
| 2003/0231118 | A1 | 12/2003 | Kitson | |
| 2006/0064223 | A1 * | 3/2006 | Voss | 701/52 |
| 2008/0142768 | A1 * | 6/2008 | Thorpe et al. | 254/423 |

OTHER PUBLICATIONS

"Bluetooth Chip That Tells of Engine Fault," http://www.bluetooth.com/news/index.asp?A=2& PID=263, dated Sep. 23, 2003, *EETimes,* downloaded and printed on Apr. 27, 2004.

"Expanding Automotive Electronic Systems," http://grouper.ieee.org/groups/1616/ARTICLEVehicleNetworks.pdf, *IEEE,* dated Jan. 2002, by Gabriel Jean and Donal Heffernan.

"Innovative Wireless Applications for the Design and Manufacture of Automotive Products," http://primetechnologywatch.org.uk/documents/Wireless_automotive.pdf, by Peter McLeod (Copyright 2003 by Pera Knowledge).

"Examining Bluetooth and Wi-Fi's Entry into the Automotive Platform," http://www.itsa.org/ITSNEWS.NSF/0/39a6f38b2a2a90e885256c3e006c05f1?OpenDocument, dated Sep. 25, 2002, Frank Viquez, downloaded and printed on Apr. 27, 2004.

"Visteon Drives Bluetooth® Development into the Vehicle," http://www.visteon.com/about/features/2001/030601.shtml, dated Mar. 6, 2001, downloaded and printed on Apr. 27, 2004.

"How Bluetooth Works," http://electronics.howstuffworks.com/bluetooth.htm/printable, by Curt Franklin, downloaded and printed Apr. 8, 2004.

Memorandum—"802.11 Wireless Networking," dated Aug. 28, 2002, by Danny R. Graves.

Episode 93—"HP 1," *American Chopper* television series, originally aired on Mar. 29, 2007 on The Learning Channel, discussing the mounting of the handheld Global Positioning System unit onto a motocycle.

Episode 94—"HP 2, " *American Chopper* television series, originally aired on Apr. 5, 2007 on The Learning Channel, discussing the mounting of a handheld Global Positioning System unit onto a motorcycle.

* cited by examiner

WIRELESSLY CONTROLLED MOTORIZED VEHICLE SYSTEM

PRIORITY

This application claims priority from the disclosure of U.S. Provisional Patent Application Ser. No. 60/793,312, filed Apr. 19, 2006, entitled “Enabling Wireless Control of Various Subsystems in Motorcycles,” the disclosure of which is incorporated by reference herein in its entirety.

BACKGROUND

Conventional motorized vehicles typically include a plurality of mechanical subsystems and various devices configured to control and/or monitor those subsystems. In general, the controls and gauges are physically connected to the mechanical subsystem they are associated with via a cable or wire. For example, in a conventional motorcycle, the clutch handle is physically connected to the clutch assembly via a clutch cable. Similarly, in a conventional motorcycle, the throttle handle is connected to the carburetor via a throttle cable. In addition, the gauges on a conventional motorcycle, such as the speedometer, the tachometer, typically include a control wire connecting the sensing portion of the gauge positioned proximate to a mechanical subsystem to the gauge display viewed by the rider. Other conventional motorized vehicles, such as riding lawn mowers and push lawn mowers, have similar physical connections between the controls/gauges and the associated subsystems.

One result of the physical connections required by most conventional motorized vehicles is that the cable and/or wire may be susceptible to increased damage if it is left exposed during use. Therefore, motorized vehicles are typically designed to provide a housing for the cable and/or wire as it runs from the control to the appropriate subsystem. For example, in a conventional motorcycle, the handlebars are configured in a continuous, hollow, tubular shape to provide a protective pathway through which to run the clutch cable and throttle cable from the controls to the clutch assembly and carburetor, respectively. Similarly, the control wires connecting the sensing portion of the gauge to the gauge displays may also be threaded through the handlebars to prevent damage.

Removing the physical connections between a control and a subsystem or between a gauge and a display may provide fabricators with the freedom to design new motorized vehicles, for example, new motorcycles with new types of handlebars that are not required to provide housing for cables and/or wires. Providing increased freedom in the fabrication of handlebars may enable the development of more aesthetically pleasing, aerodynamic, ergonomically improved, and/or lighter weight handlebars. Finally, removing the physical connections between a control and a subsystem or between a gauge and a display may provide increased options for customization of motorized vehicles. For example, users may choose completely unique components rather than being required to choose from a list of stock components. Therefore, it may be desirable to provide a wirelessly controlled system to allow a user to control and/or monitor various subsystems.

BRIEF DESCRIPTION OF THE DRAWINGS

While the specification concludes with claims that particularly point out and distinctly claim the invention, it is believed the present invention will be better understood from the following description taken in conjunction with the accompanying drawings, in which like reference numerals identify the same elements. The drawings and detailed description which follow are intended to be merely illustrative and are not intended to limit the scope of the invention as set forth in the appended claims.

FIG. *14a* depicts a side view of an alternate embodiment of a wirelessly controlled motorized vehicle system, wherein the motorized vehicle comprises a motorcycle.

FIG. *14b* depicts the reverse side view of the system shown in FIG. *14a*.

Figure 15:
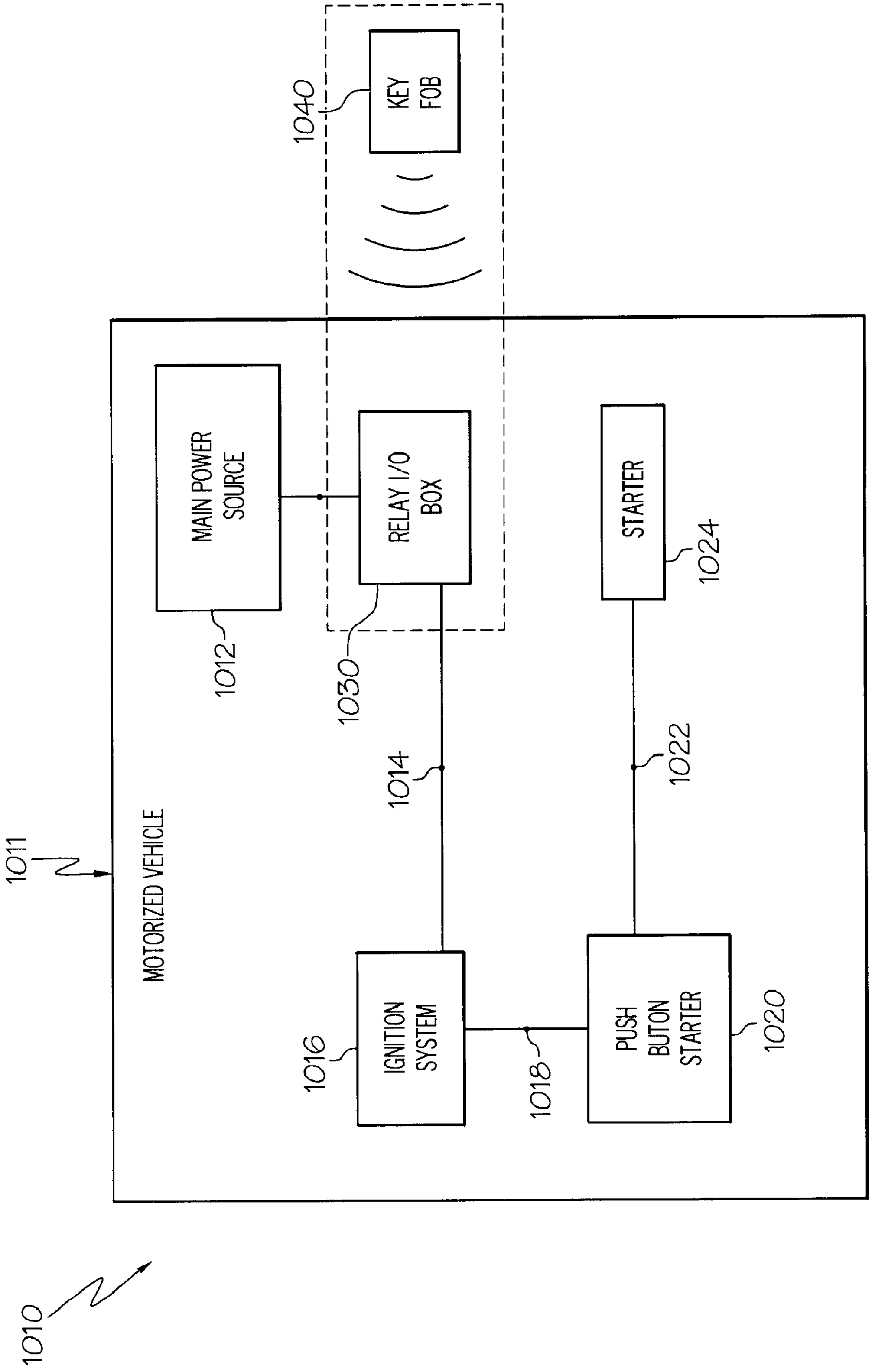

FIG. 15 is a block diagram showing an embodiment of a wireless security system.

Figure 16:
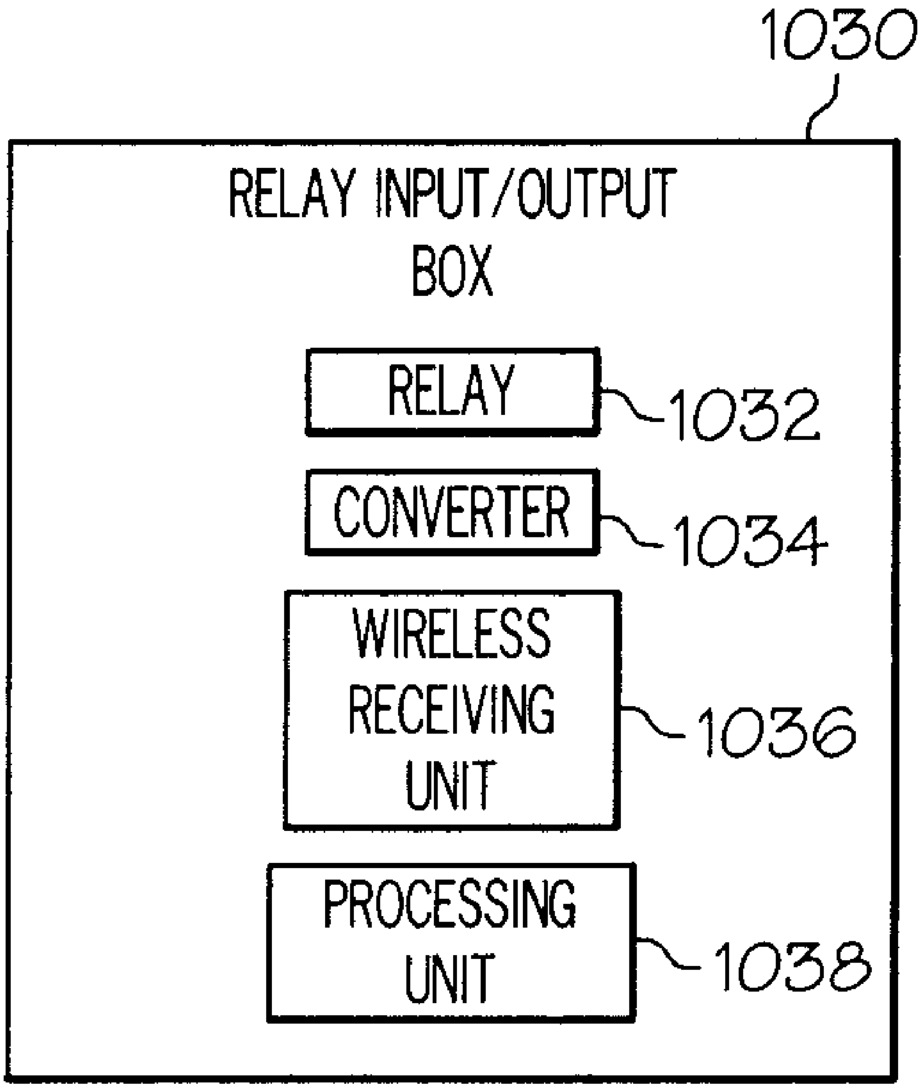

FIG. 16 is a block diagram showing a detailed embodiment of one of the components of the system shown in FIG. 15.

Figure 17:
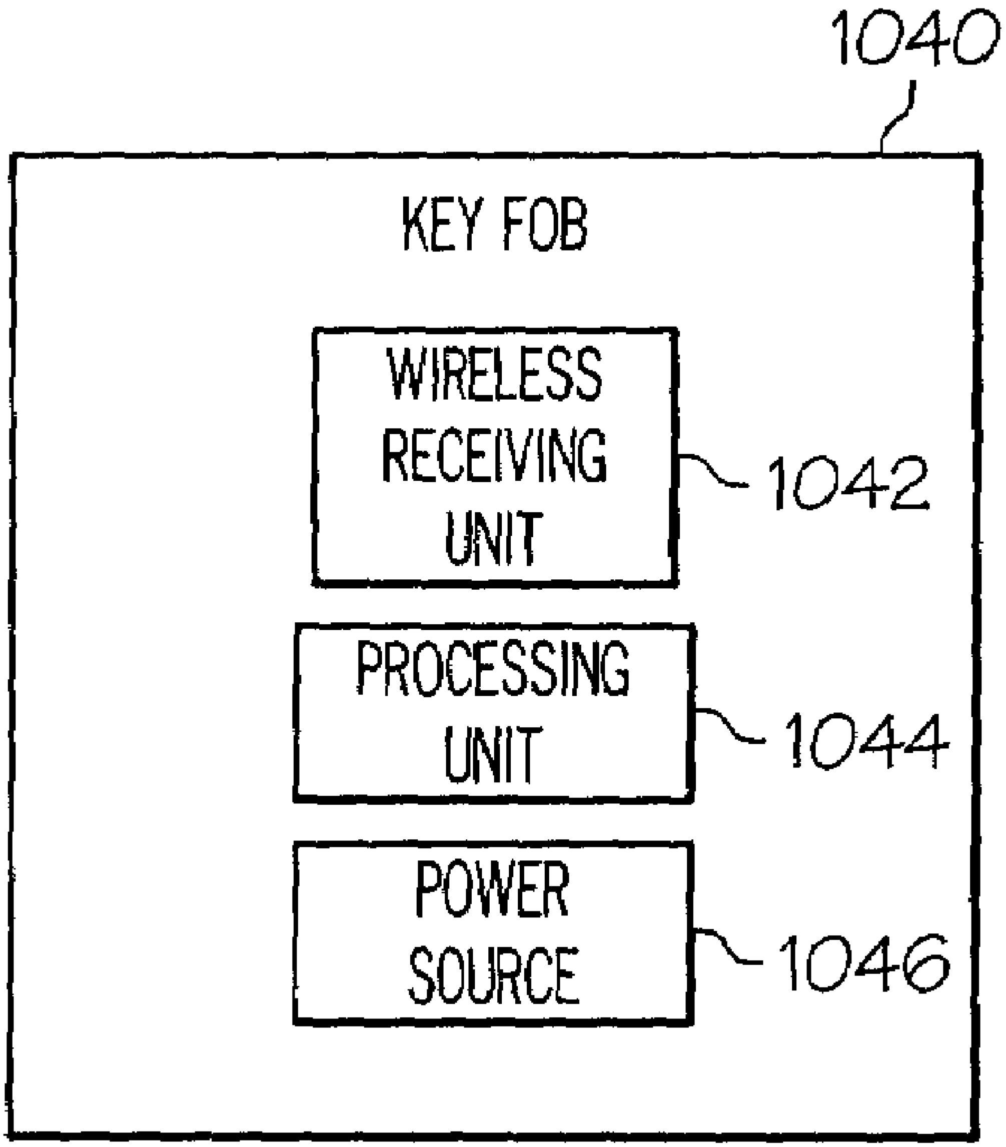

FIG. 17 is a block diagram showing a detailed embodiment of one of the components of the system shown in FIG. 15.

DETAILED DESCRIPTION OF THE INVENTION

The following description should not be used to limit the scope of the present invention. Other examples, features, aspects, embodiments, and advantages of the invention will become apparent to those skilled in the art from the following description, which includes by way of illustration, one embodiment contemplated for carrying out the invention. As will be realized, the invention is capable of other different and obvious aspects, all without departing from the invention. Accordingly, the drawings and descriptions should be regarded as illustrative in nature and not restrictive. It should therefore be understood that the inventors contemplate a variety of embodiments that are not explicitly disclosed herein.

Figure 1:
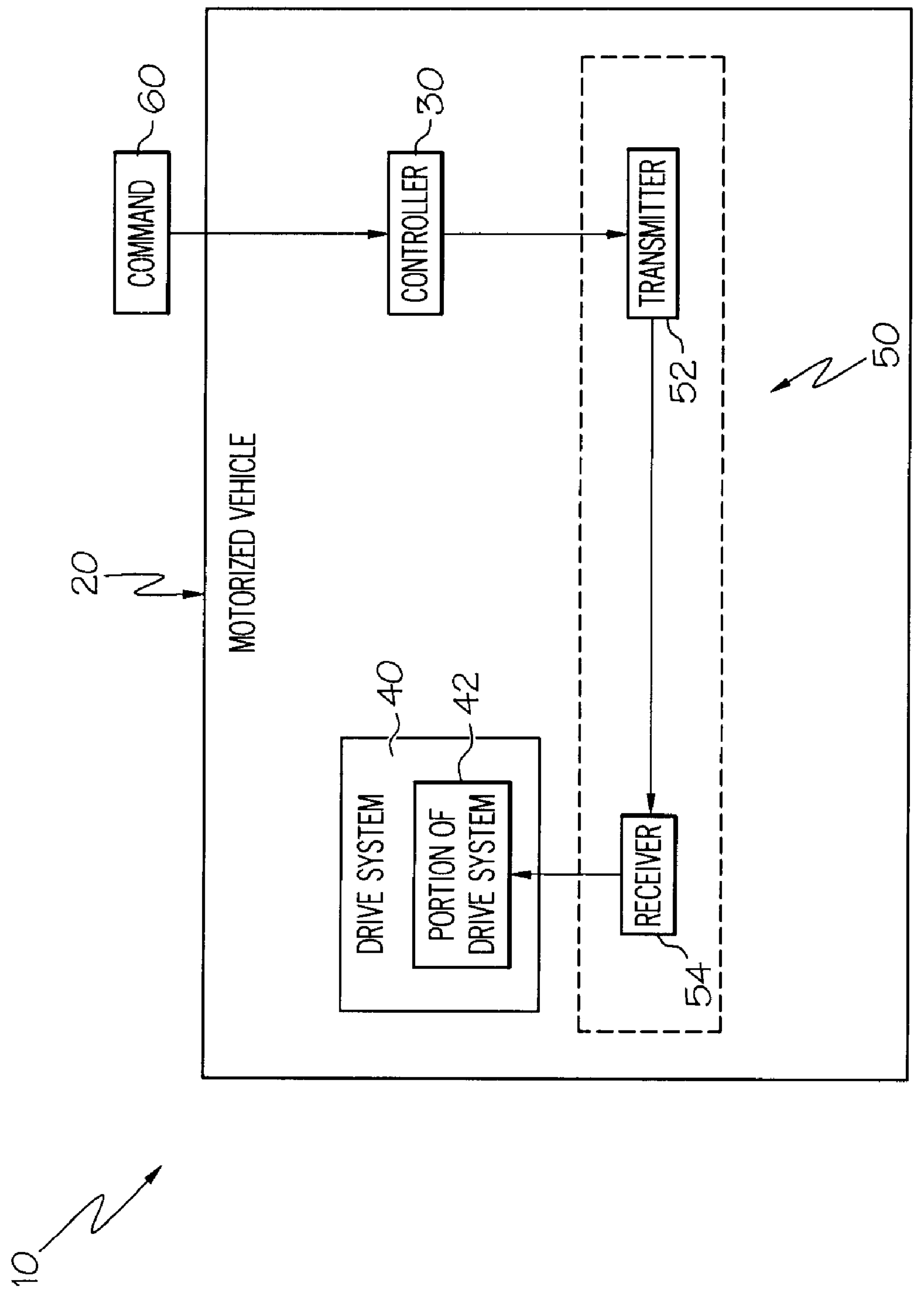
FIG. 1 is a block diagram showing a wirelessly controlled motorized vehicle system including a controller and a drive system constructed in accordance with the present invention.

FIG. 1 depicts a schematic view of an exemplary wirelessly controlled motorized vehicle system (10). As shown, the system (10) comprises a motorized vehicle (20) and a wireless communications system (50). It will be appreciated that the motorized vehicle (20) may comprise a motorcycle, a lawn mower, or any other suitable motorized vehicle. In the present example, the motorized vehicle (20) comprises a controller (30) and a drive system (40). As used throughout this application, the term "controller" refers to a device or assembly configured to receive input from the user regarding the operation of a portion of the drive system. A controller may function as and/or replace one or more of the following conventional motorcycle controls: a clutch handle, a throttle handle, a hand shifter, or any other similar conventional control. In addition, as used throughout this application, the term "drive system" refers to one or more systems or components of a motorized vehicle configured to enable locomotion of the motorized vehicle. In this example, the drive system (40) comprises a portion of the drive system (42). The portion of the drive system (42) may comprise one or more of the systems or components configured to enable locomotion of the motorized vehicle.

As shown in FIG. 1, the controller (30) is in communication with the portion of the drive system (42) via the wireless communications system (50), which comprises a transmitter (52) and a receiver (54). In this version, the transmitter (52) is associated with the controller (30) and the receiver (54) is associated with the portion of the drive system (42). Although the system (10) shown in FIG. 1 includes one controller (30) and one portion of the drive system (42), it will be appreciated that a system may comprise any suitable number of controllers and portions of the drive system. It will further be appreciated that the number of controllers may correspond to the number of portions of the drive system, but this is not required.

Figure 3:
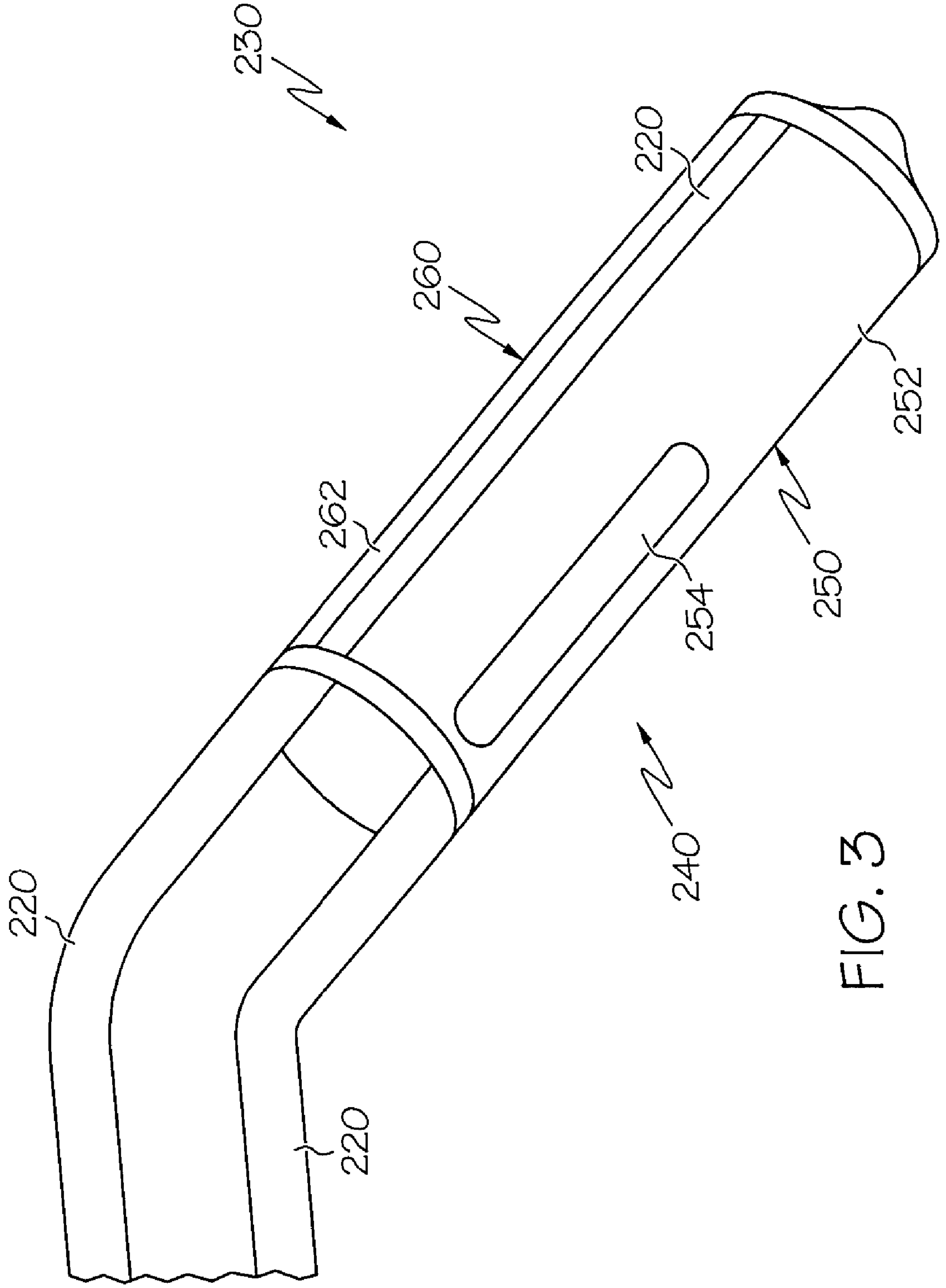
FIG. 3 depicts a perspective view of an exemplary embodiment of a controller constructed in accordance with the present invention.

As shown, the controller (30) is configured to receive a command (60) from a user. It will be appreciated that the controller (30) may comprise a handgrip assembly, as shown in FIG. 3, or any other suitable device. The command (60) may comprise an instruction to disengage the clutch, increase the throttle, change gears, or any other suitable instruction. The command (60) may be communicated to the controller (30) by physically manipulating the controller (30). The controller (30) may be integral with the motorized vehicle (20). A processing unit (not shown), such as a microprocessor, a microcontroller, a parallax chip, or any other suitable device, may be used to facilitate communication of the command (60) from the controller (30) to the transmitter (52). In particular, the processing unit (not shown) may comprise an 8-bit PIC based microcontroller, but this is not required. It will be appreciated that the controller (30) and the wireless communication system (50) may be powered by a battery, such as a button cell battery, or any other suitable power source or device.

Figure 2:
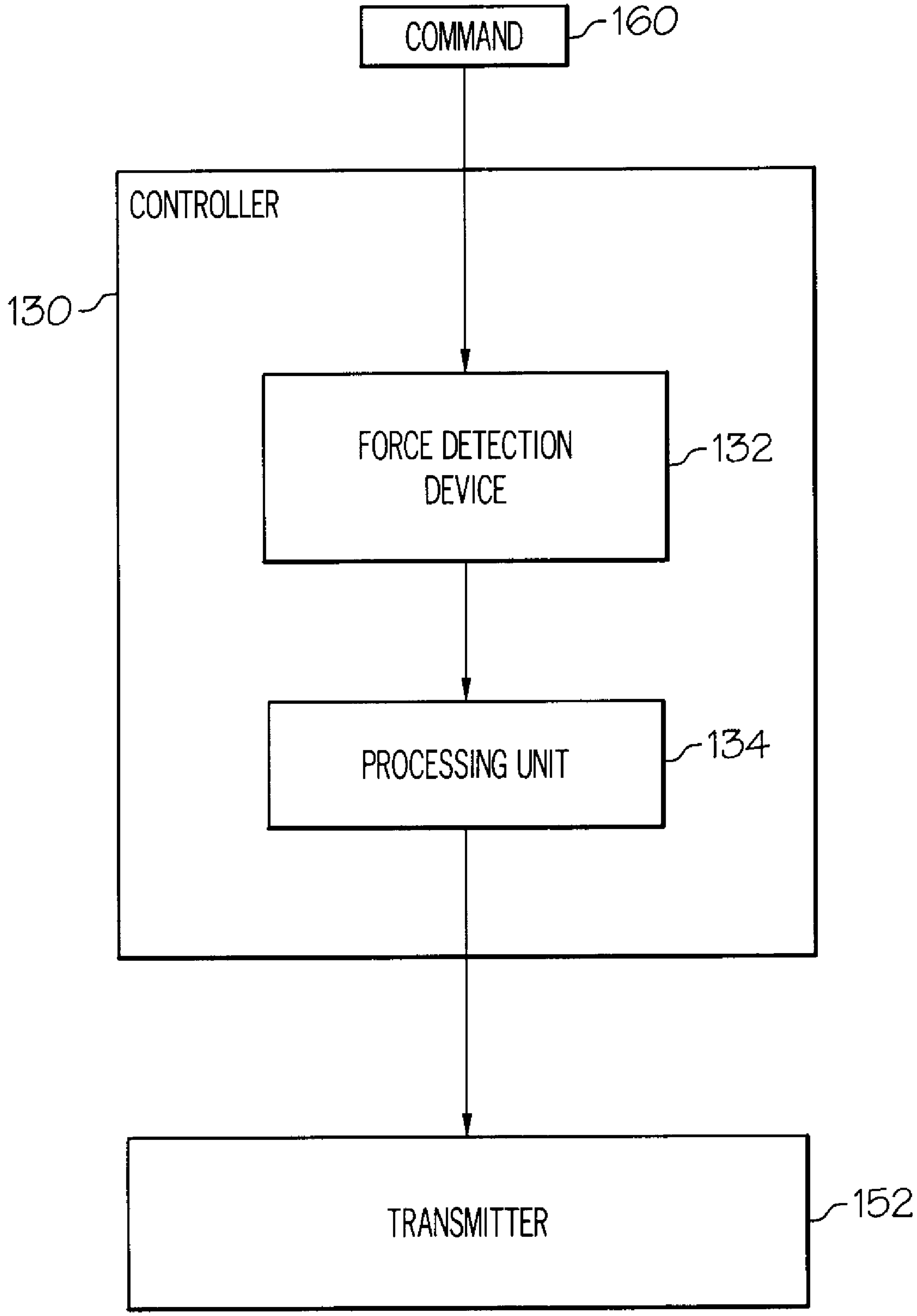
FIG. 2 is a block diagram showing an embodiment of a controller including a force detection device and a processing unit constructed in accordance with the present invention.

FIG. 2 depicts a schematic view of an exemplary embodiment of a controller (130). As shown, the controller (130) comprises a force detection device (132) and a processing unit (134). The force detection device (132) may be configured to detect pressure applied as the user inputs a command (160) by manipulating the controller (130). The force detection device (132) may comprise a pressure sensitive molecular microswitch, a thin film force sensor, or any other suitable device. The processing unit (134) may be configured to facilitate communication between the force detection device (132) and a transmitter (152). In the present example, the processing unit (134) is configured to receive an output from the force detection device (132) and communicate that output to the transmitter (152). The processing unit (134) may comprise a microprocessor, a microcontroller, a parallax chip, or any other suitable device. In particular, the processing unit (134) may comprise an 8-bit PIC based microcontroller, but this is not required. A replacement protocol may be programmed into the processing unit (134) to facilitate the replacement of damaged components, such as transmitters, receivers, or processing units, which may comprise computer chips, by enabling the pairing of the replacement component with the proper existing components. The processing unit (134) may be configured to communicate a code along with the numerical value to the transmitter (152). The code may be used to verify the signal and/or to identify the particular controller (130) from which the signal originated. It will be appreciated that the force detection device (132) and the processing unit (134) may be powered by a battery, such as a button cell battery, or any other suitable power source or device.

Although the embodiment of a controller shown in FIG. 2 includes a processing unit (134), it will be appreciated that a processing unit is not required. For example, a controller may comprise a force detection device. In such an embodiment, the force detection device may be configured to communicate directly with the transmitter. The output from the force detection device may then be converted to a numerical value by the transmitter and communicated to a receiver associated with a portion of the drive system.

FIG. 3 depicts an alternate embodiment of a controller (230) comprising a hand grip assembly (240) attached to a handlebar frame (220). The handgrip assembly (240) may be integral with the handlebar frame (220) or removably attached to the handlebar frame (220). The hand grip assembly (240) may be attached to the handlebar frame (220) with set screws, bolts, welds, or any other suitable device or method. As shown in FIG. 3, the handgrip assembly (240) comprises an upper portion (250) and a lower portion (260). In the present example, upper portion (250) comprises a rounded outer surface (252) and a pressure panel (254). Similarly, as shown, the lower portion (260) comprises a rounded outer surface (262). In this version, the controller (230) is positioned such that a user may grasp the handgrip assembly (240) while steering the motorized vehicle. A wirelessly controlled motorized vehicle system may comprise two handgrip assemblies positioned on opposite ends of the handlebar frame, where one handgrip assembly is associated with the clutch and the other handgrip assembly is associated with the throttle, but this is not required.

Figure 4:
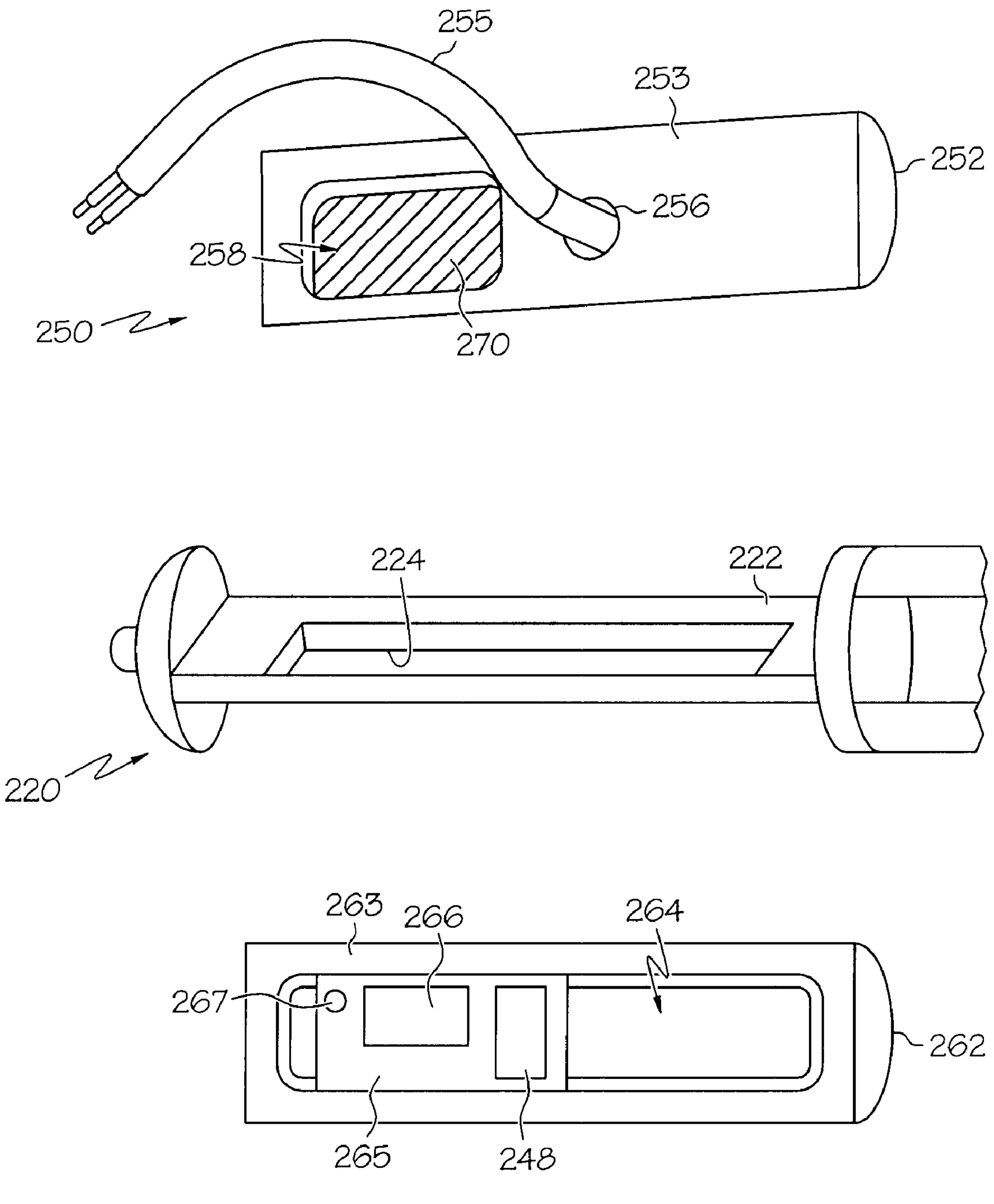
FIG. 4 depicts a perspective view of exemplary components of the controller shown in FIG. 3.
Figure 5:
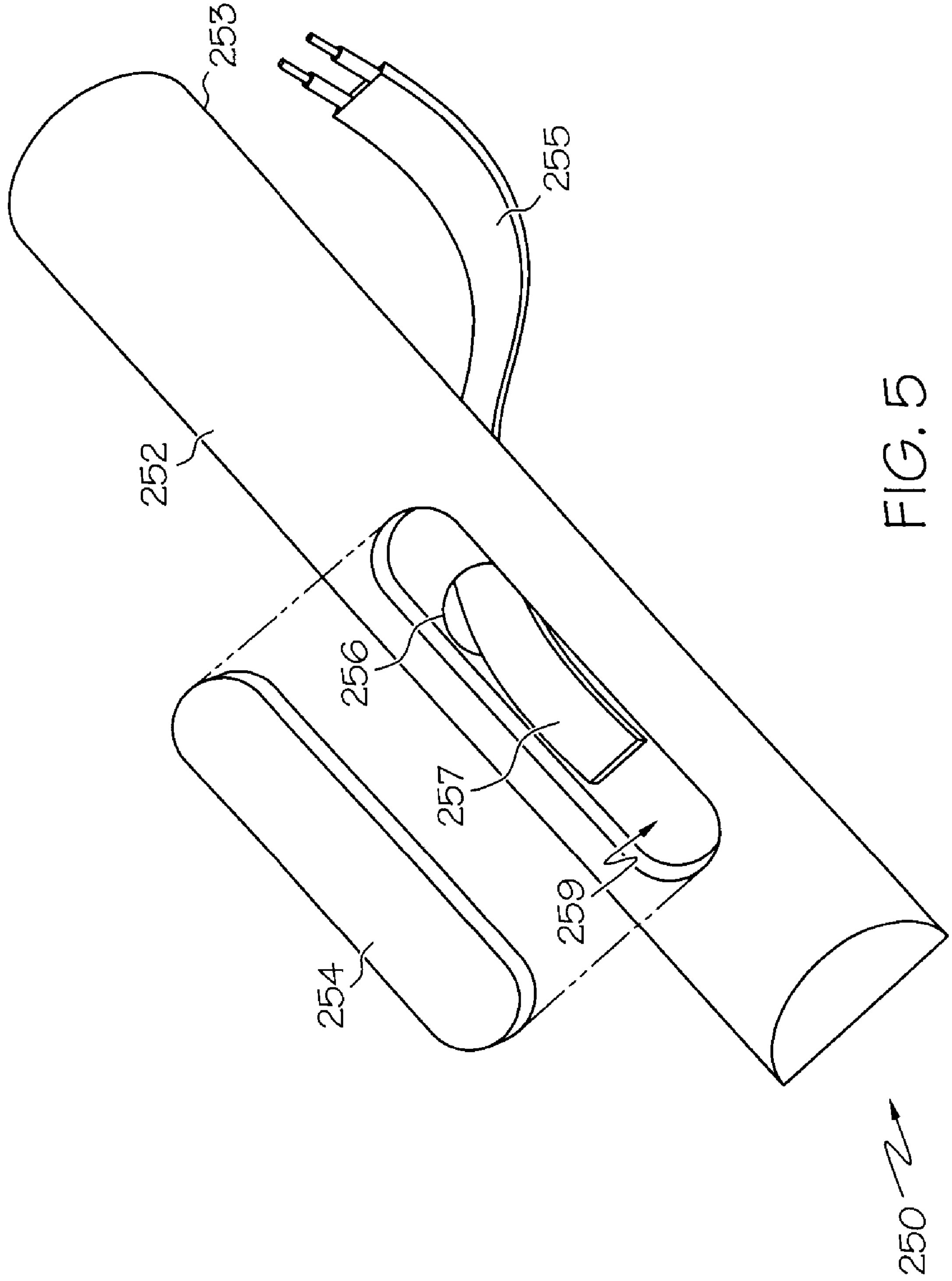
FIG. 5 depicts a perspective view of exemplary components of the controller shown in FIG. 3.

FIGS. 4-5 depict exemplary components of the handgrip assembly (240). In this version, in addition to the rounded outer surface (252) and the pressure panel (254), the upper portion (250) comprises a flattened inner surface (253), a force detection device (255), an aperture (256), and a cavity (258). As shown in FIG. 5, the force detection device (255) is inserted through the aperture (256) such that a sensor portion (257) is inserted into a recess (259) and positioned proximate to the pressure panel (254) when the pressure panel (254) is positioned within recess (259). Thereby, the pressure panel (254) is able to contact the sensor portion (257) when a user applies pressure to the pressure panel (254). The force detection device (255) may comprise a pressure sensitive molecular microswitch, a thin film force detector, or any other suitable device. In the present example, the upper portion (250)

also comprises dampening material (270) positioned within the cavity (258) and configured to reduce vibrations within the cavity (258). The dampening material (270) may be surface mounted within cavity (258) by any suitable device or method.

As shown in FIG. 4, in addition to the rounded outer surface (262), the lower portion (260) comprises a flattened inner surface (263), a trough (264), a component support member (265), a processing unit (266), a power source (267) and a transmitter (268). The trough (264) may be formed within the lower portion (260) by milling or any other suitable process. In the illustrated version, the processing unit (266), the power source (267) and the transmitter (268) are attached to the component support member (265), which is then positioned within the trough (264) and attached to the lower portion (260). The processing unit (266) may comprise a microprocessor, a microcontroller, a parallax chip, or any other suitable device. In particular, the processing unit (266) may comprise an 8-bit PIC based microcontroller, but this is not required. Additionally, the transmitter (268) may comprise a BLUETOOTH™ transceiver, a ZIGBEE™ transceiver, or any other suitable device. The power source (267) may be configured to provide power to the processing unit (266) and the transmitter (268). The power source (267) may comprise a button cell battery or any other suitable device.

As shown in FIG. 3, the handgrip assembly (240) may be assembled by connecting the force detection device (255) to the processing unit (266). Additionally, the upper portion (250) may be positioned such that the flattened inner surface (253) is proximate to a first surface (222) of the handlebar frame (220), and the lower portion (260) may be positioned such that the flattened inner surface (263) is proximate to a second surface (224) of the handlebar frame (220). During assembly, the cavity (258) may be positioned above the component support member (265) to provide a housing for the processing unit (266) and the transmitter (268).

As described above, dampening material (270) may be attached to the upper portion (250) within the cavity (258) to help reduce damage to the processing unit (266) and the transmitter (268) once they are positioned within the cavity (258). The dampening material may comprise static resistant rubber foam or any other suitable material. The dampening material (270) may help reduce damage by being configured to absorb vibrations, thereby reducing the amount of vibrations that reach the processing unit (266) and the transmitter (266). In addition, the dampening material (270) may be configured to provide additional support to stabilize the processing unit (266) and the transmitter (268). Finally, the dampening material may be configured to block any residual or unexpected electrical current flowing through the handlebar frame (220), thereby further protecting the processing unit (266) and the transmitter (268).

The sensitivity of the force detection device (255) may be calibrated based on the characteristics of an individual user, thereby enabling the user to determine the magnitude of the response in the drive system resulting from applying a specified amount of pressure to the pressure panel (254). For example, the calibration may be based on the user's preferences, the user's physical characteristics, such as weight or strength, the user's skill level in operating the motorized vehicle, or any other suitable characteristic. The force detection device (955) may be calibrated using standard calibration techniques well known within in the art. For example, as pressure is applied to a force detection device, it registers a series of reference points corresponding to the amount of pressure applied. Those reference points are then communicated to a mechanical device, such as the manipulation device (370) described and shown below. The reference points then instruct the mechanical device how far to move or rotate. Compared to conventional controls connected by control cables or control wires, this calibration may provide increased responsiveness between the controller (230) and the associated mechanical component. In addition, the calibration may improve the safety of users by providing the user with increased control over the motorized vehicle.

In one embodiment, a user may input an instruction to increase throttle, disengage the clutch, shift gears, or any other suitable instruction by applying pressure to the pressure panel (254). The force detection device (255) may be configured as a RC time constant circuit. In this version, the force detection device (255) may register the level of pressure applied by the user and communicate that information to the processing unit (266). In this example, the processing unit is configured to receive the RC time constant output from the force detection device (255) and convert the output into a numerical value. The numerical value may then be communicated to the transmitter (268) and, ultimately, wirelessly communicated to the throttle, the clutch, the transmission or any other suitable portion of the drive system.

Returning now to FIG. 1, the wireless communications system (50) comprises a transmitter (52) and a receiver (54). In this version, the transmitter (52) is in communication with the controller (30), and the transmitter (52) receives the command (60) from the controller (30). In the present example, the receiver (54) is associated with the portion of the drive system (42). As shown, the transmitter (52) is configured to wirelessly communicate the command (60) to the receiver (54). Once wirelessly communicated to the receiver (54), the command (60) is then communicated to the portion of the drive system (42).

The wireless communications system (50) may be configured to communicate via at least one of BLUETOOTH™ protocol, ZIGBEE™ protocol, any other wireless communication protocols operating at a frequency above 2.4 GHz or any other suitable technology or protocol configured to wirelessly communicate signals. It will be appreciated that the transmitter (52) may comprise a BLUETOOTH™ transceiver, a ZIGBEE™ transceiver or any other suitable device. It will also be appreciated that the receiver (54) may comprise a BLUETOOTH™ transceiver, a ZIGBEE™ transceiver or any other suitable device. In this example, the type of transmitter (52) corresponds to the type of receiver (54) such that the transmitter (52) and receiver (54) can communicate with each other. It will be appreciated that the transmitter (52) and the receiver (54) may be integral with the motorized vehicle (20). By way of example only, the transmitter (52) may be embedded within the controller (30), as shown in FIGS. 3-4, positioned within a container mounted to the motorized vehicle, such as the compartment (950) shown in FIG. 14*b*, mounted to the frame of the motorized vehicle, or any other suitable location. Similarly, by way of example only the receiver (54) may be embedded within the drive system (40), positioned within a container mounted to the motorized vehicle, such as the compartment (950) shown in FIG. 14*b*, mounted to the frame of the motorized vehicle, or in any other suitable location. It will be appreciated that the transmitter (52) and the receiver (54) may be powered by a battery, such as a button cell battery, or any other suitable power source or device.

As shown in FIG. 1, the wireless communications system (50) comprises one transmitter (52) and one receiver (54). In this example, the transmitter (52) and the receiver (54) are configured as a pair, whereby the transmitter (52) and the receiver (54) are coded to detect and transmit signals to each other at a specified bandwidth. The bandwidth may be determined by the particular protocol being used by the wireless communications system (50). It will be appreciated that, in such an embodiment, the transmitter (52) and the receiver (54) are in constant communication and do not break signal once they are activated. However, it will also be appreciated that the wireless communications system may comprise any suitable number of transmitters and any suitable number of receivers. It will further be appreciated that the number of transmitters may correspond to the number of controllers, and the number of receivers may correspond to the number of transmitters, however this is not required. For example, a single transmitter may be configured to communicate with multiple receivers, or a single receiver may be configured to communicate with multiple transmitters. In addition, it will be appreciated that the number of receivers may correspond to the number of portions of the drive system; however, this is not required.

As shown in FIG. 1, the motorized vehicle (20) comprises a drive system (40) and a portion of the drive system (42). It will be appreciated that the portion of the drive system (42) may comprise one or more of the systems or components comprising the drive system (40), such as an engine, a transmission, a clutch assembly, a clutch plate, a throttle system, a throttle plate, an ignition system, a starter, or any other suitable system or component. In the present example, the portion of the drive system (42) is in communication with the wireless communications system (50) via the receiver (54). Similar to the communication between the controller (30) and the transmitter (52) described above, a processing unit (not shown), such as a microprocessor, a microcontroller, a parallax chip, or any other suitable device, may be used to facilitate communication of the command (60) from the receiver (54) to the portion of the drive system (42). In particular, the processing unit (not shown) may comprise an 8-bit PIC based microcontroller, but this is not required. In addition, a processing unit (not shown) may also be configured to use a code communicated with the command (60), as described above, to verify the signal containing the command (60) and/or identify the particular transmitter (52) or controller (30) from which the command (60) originated. If a processing unit (not shown) is used to facilitate communication between the receiver (54) and the portion of the drive system (42), the processing unit (not shown) may be powered by a battery, such as a button cell battery, or any other suitable power source or device.

Figure 6:
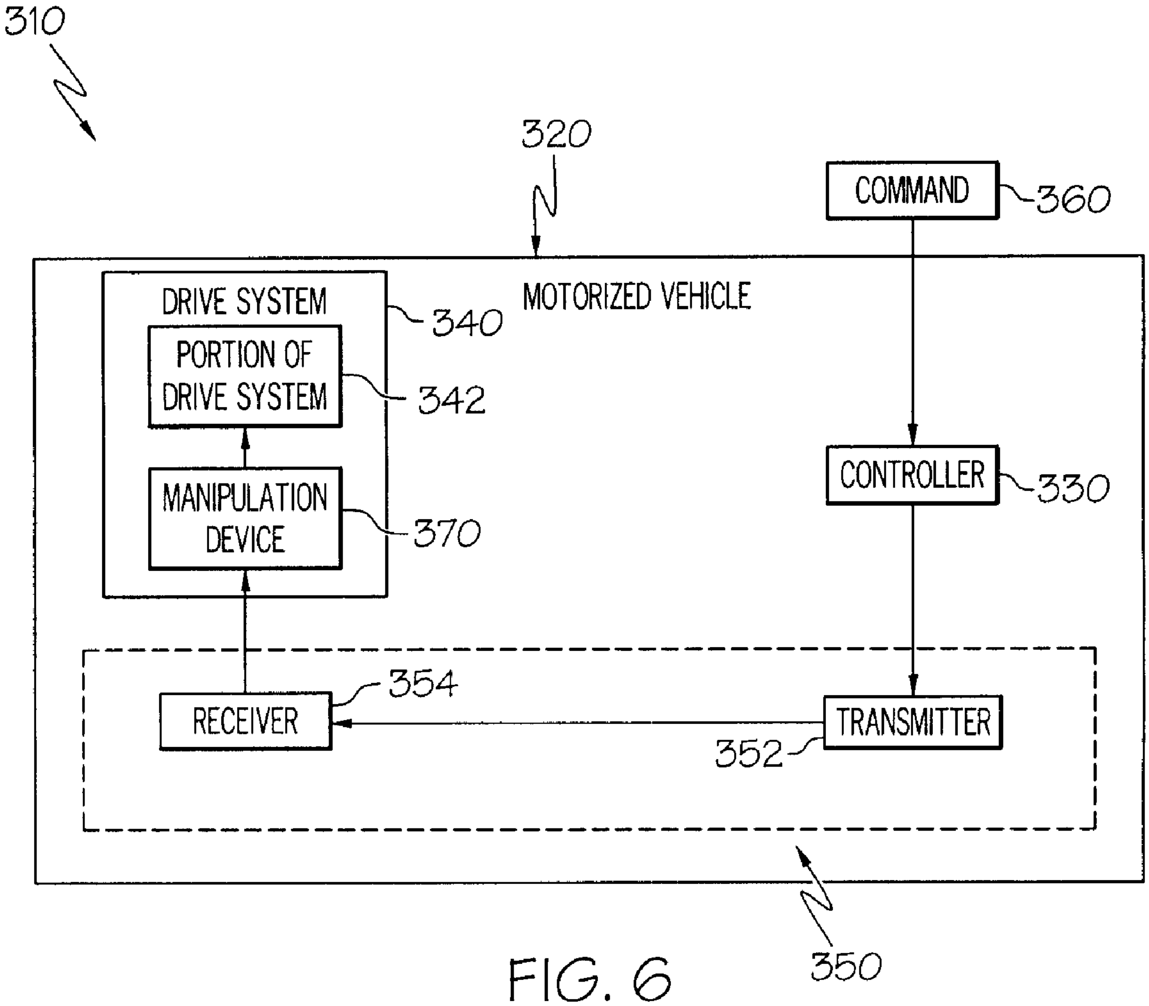
FIG. 6 is a block diagram showing an alternative wirelessly controlled motorized vehicle system including a manipulation device constructed in accordance with the present invention.

FIG. 6 depicts a schematic view of an alternate wirelessly controlled motorized vehicle system (310) that is similar to the system (10) depicted in FIG. 1. However, in this version, the system (310) comprises a motorized vehicle (320), a controller (330), a drive system (340), a wireless communications system (350) and an additional element, a manipulation device (370). Similar to the system (10) described above, a user can input a command (360) into the controller (330), and the command (360) is ultimately communicated to a portion of the drive system (342) via the wireless communications system (350), which comprises a transmitter (352) and a receiver (354). The portion of the drive system (342) may comprise one or more systems or components, including an engine, a transmission, a clutch assembly, a clutch plate, a throttle system, a throttle plate, an ignition system, a starter, or any other suitable system or component. It will be appreciated that the controller (330) and the wireless communications system (350) may be powered by a battery, such as a button cell battery, or any other suitable power source or device.

In the present example, the manipulation device (370) is in communication with the receiver (354) and the portion of the drive system (342). The manipulation device (370) may be configured to manipulate the portion of the drive system (342) in a manner corresponding to the command (360). For example, in one embodiment, the manipulation device (370) may be configured to open the throttle plate on the carburetor in response to a command to increase throttle. The manipulation device (370) may comprise a servo motor, a stepper motor, or any other suitable device. In particular, the manipulation device (370) may comprise a stepper motor configured to operate in temperatures up to about 150 degrees Fahrenheit or above. The manipulation device (370) may be connected to and derive power from a current generating portion of the drive system (340), such as the ignition coil (shown in FIG. 14*b*) or any other suitable component of the motorized vehicle (320). In the present example, the system (310) comprises one manipulation device (370); however, it will be appreciated that any suitable number of manipulation devices may be used. For instance, a plurality of manipulation devices may be coupled with a plurality of portions of the drive system. In such an embodiment, each manipulation device would be coupled with a particular portion of the drive system.

As shown in FIG. 6, the manipulation device (370) is configured to receive the command (360) from the receiver (354) and manipulate the portion of the drive system (342) in a manner corresponding to the command (360). Similar to the system (10) described above, a processing unit (not shown), such as a microprocessor, a microcontroller, a parallax chip, or any other suitable device, may be used to facilitate communication between the receiver (354) and the manipulation device (370). In particular, the processing unit (not shown) may comprise an 8-bit PIC based microcontroller, but this is not required. The manipulation device (370) may be coupled with the portion of the drive system (342) via a linking member configured to translate the actuation of the manipulation device (370) into appropriate manipulation of the portion of the drive system (342). In one version (not shown), the manipulation device may be coupled with a throttle plate, such that when the manipulation device is actuated in response to a command to increase the throttle, the manipulation device positions the throttle plate toward an open or full-throttle position.

Figure 7:
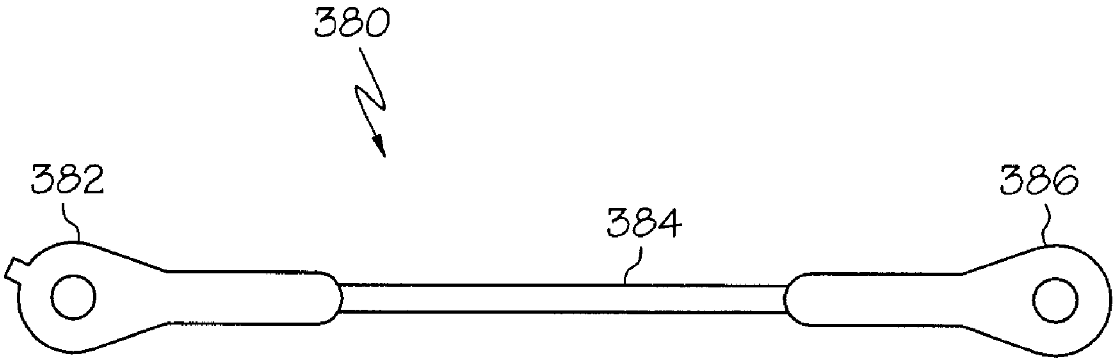
FIG. 7 depicts a top view of an exemplary embodiment of a linking member constructed in accordance with the present invention.

FIG. 7 depicts one embodiment of a linking member (380) adapted for use with the system of the present invention. As shown, the linking member (380) comprises a first attachment portion (382), a connecting member (384) and a second attachment portion (386). In this version, the first attachment portion (382) is configured to be attached to a manipulation device (not shown), and the second attachment portion (386) is configured to be attached to a portion of the drive system (not shown). The configuration of the linking member may vary depending on the particular portion of the drive system (not shown) that the linking member is attached to.

Figure 8:
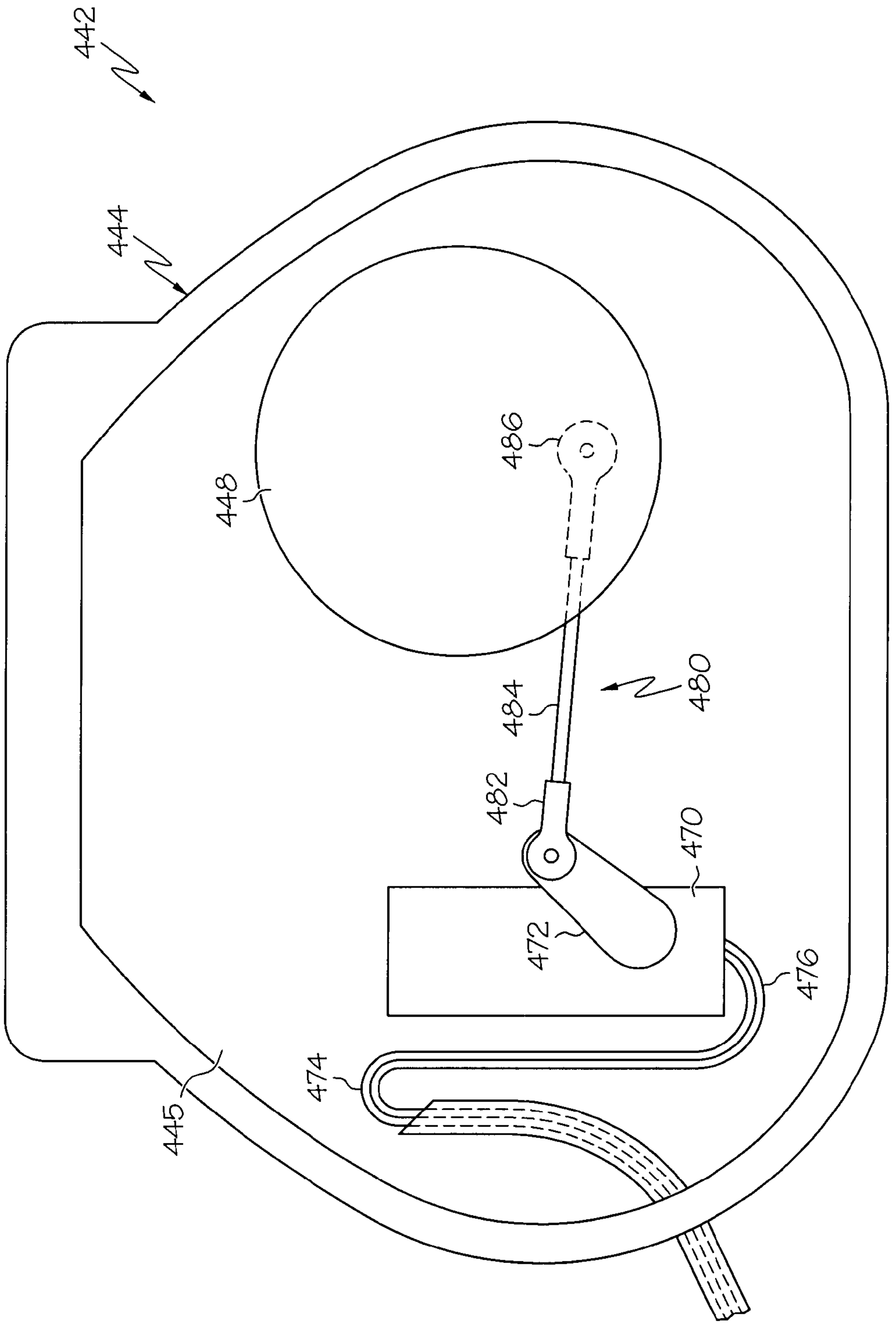
FIG. 8 depicts a partial front view of an embodiment of components of the system illustrated in FIG. 6, including a manipulation device mounted to a clutch cover and connected to a clutch plate with a linking member.

For example, FIG. 8 depicts a drive system (440) similar to the drive system (340) shown schematically in FIG. 6. As shown in FIG. 8, the drive system (440) comprises portion of a drive system (442), a manipulation device (470) and a linking member (480). In the present example, the portion of the drive system (442) comprises a clutch assembly comprising a clutch cover (444), also shown in FIG. 14*b*, and a clutch plate (448). The clutch assembly may comprise a standard multi-disc clutch or any suitable clutch used in motorized vehicles, such as motorcycles. The remaining components of the clutch assembly are not shown. In this version, the clutch cover (444) comprises an inner surface (445).

In the present example the manipulation device (470) is mounted to the inner surface (445) and comprises an arm (472). The manipulation device (470) may be mounted to the inner surface (445) using bolts, screws, brackets, or any other suitable method or device, and the manipulation device (470) may comprise a servo motor, a stepper motor, or any other suitable device. In this version, the manipulation device (470) is configured to rotate the arm (472) in response to a command input by a user. As shown in FIG. 8, the manipulation device (470) is connected to a power source (not shown) via a first control wire (474), and the manipulation device (470) is configured to communicate with a receiver (not shown) via a second control wire (476). The power source (not shown) may comprise an ignition coil (shown in FIG. 14*b*) or any other suitable component of the motorized vehicle. In addition, the receiver (not shown) in communication with the manipulation device (470) may be mounted in a compartment (shown in FIG. 14*b*) mounted elsewhere on the motorized vehicle. It will be appreciated that mounting the manipulation device (470) to an easily removable component on the periphery of the motorized vehicle, such as the clutch cover (444) may enhance the ability of a user to replace the manipulation device (470) if necessary.

Returning to FIG. 8, the linking member (480) connects the arm (472) to the clutch plate (448). In this example, the linking member (480) comprises a first attachment portion (482) connected to a second attachment portion (484) via a connecting member (484). In the illustrated version, the first attachment portion (482) is connected to the arm (472), and the second attachment portion (484) is connected to the clutch plate (448). As shown, upon receiving a command to disengage the clutch, the arm (472) rotates, causing the clutch plate (448) to rotate and separate from the multi-disc clutch assembly (not shown) or standard clutch used in motorized vehicles, such as a motorcycle. When the command to disengage the clutch is no longer received, the arm (472) returns to its original position, thereby allowing the clutch plate (448) to engage the multi-disc clutch assembly (not shown) or standard clutch used in motorized vehicles, such as a motorcycle.

Figure 9:
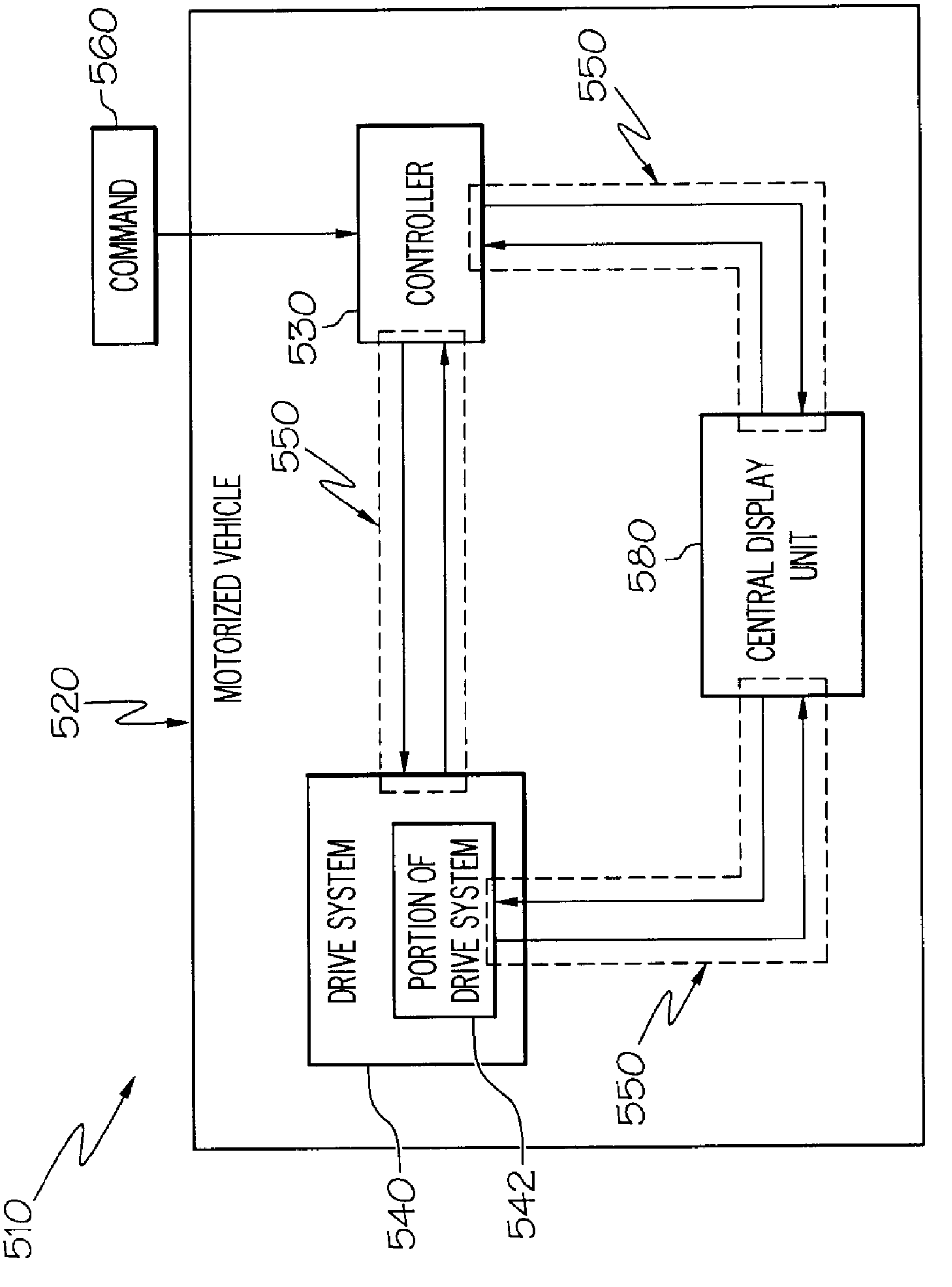
FIG. 9 is a block diagram showing an alternative wirelessly controlled motorized vehicle system including a central display unit constructed in accordance with the present invention.

FIG. 9 depicts an alternate wirelessly controlled motorized vehicle system (510) that is similar to the system (10) depicted in FIG. 1. However, in this version, the system (510) comprises a motorized vehicle (520), controller (530), a drive system (540), a wireless communications system (550), and a central display unit (580). In the present example, the controller (530) functions similarly to the controller (30) described above, and the drive system (540) functions similarly to the drive system (40) described above. In addition, the drive system (540) comprises a portion of the drive system (542), similar to the drive system (40) and the portion of the drive system (42) described above.

As shown in FIG. 9, the wireless communications system (550) functions similarly to the wireless communications systems (50) described above. However, in this embodiment, the wireless communications system (550) is configured not only to allow wireless communication between the controller (530) and the portion of the drive system (542), as in the embodiments described above, but also to allow the central display unit (580) to wirelessly communicate with both the controller (530) and the portion of the drive system (542). The wireless communications system (550) may comprise one or more receivers (not shown) and one or more transmitters (not shown), similar to the wireless communications system (50) described above. It will be appreciated that the controller (530) and the wireless communications system (550) may be powered by a battery, such as a button cell battery, or any other suitable power source or device.

As shown in FIG. 9, the central display unit (580) is configured to receive information from the controller (530) and the portion of the drive system (542) via the wireless communications system (550). In the present example, the central display unit (580) is configured to display the received data to a user. In this embodiment, the central display unit is configured to monitor one or more portions of the drive system (542) or other components of the motorized vehicle (520), but this is not required. For example, the central display unit (580) may be in communication with the ignition system of a motorized vehicle and include software configured to allow the central display unit (580) to map the timing and fuel management of the ignition system by changing the timing at which cylinders in the motor fire. In such an embodiment, the user may be able to select from a list of pre-determined settings based on the user's current operating situation or the user may be given the option to program his or her own settings. For instance, the user may be able to choose between settings configured for highway driving, city driving, full throttle driving or any other suitable setting. The central display unit (580) may comprise a personal digital assistant, a portable computer, a cellular telephone, or any other suitable device.

The central display unit (580) may be positioned on the motorized vehicle (520) to allow the user to view the information received by the central display unit (580) while operating the motorized vehicle (520). The central display unit (580) may be integral with the motorized vehicle (520) or removably attached to the motorized vehicle (520) by any suitable method or device. It will be appreciated that a replacement protocol may be programmed into the central display unit (580) to facilitate the replacement of damaged components, such as transmitters, receivers, or processing units, which may comprise computer chips, by enabling the pairing of the replacement component with the proper existing components. The central display unit (580) may also include a security feature, such as voice recognition or fingerprint recognition software, whereby the central display unit may be configured to prevent the engine from being started until proper authorization is entered.

Figure 10:
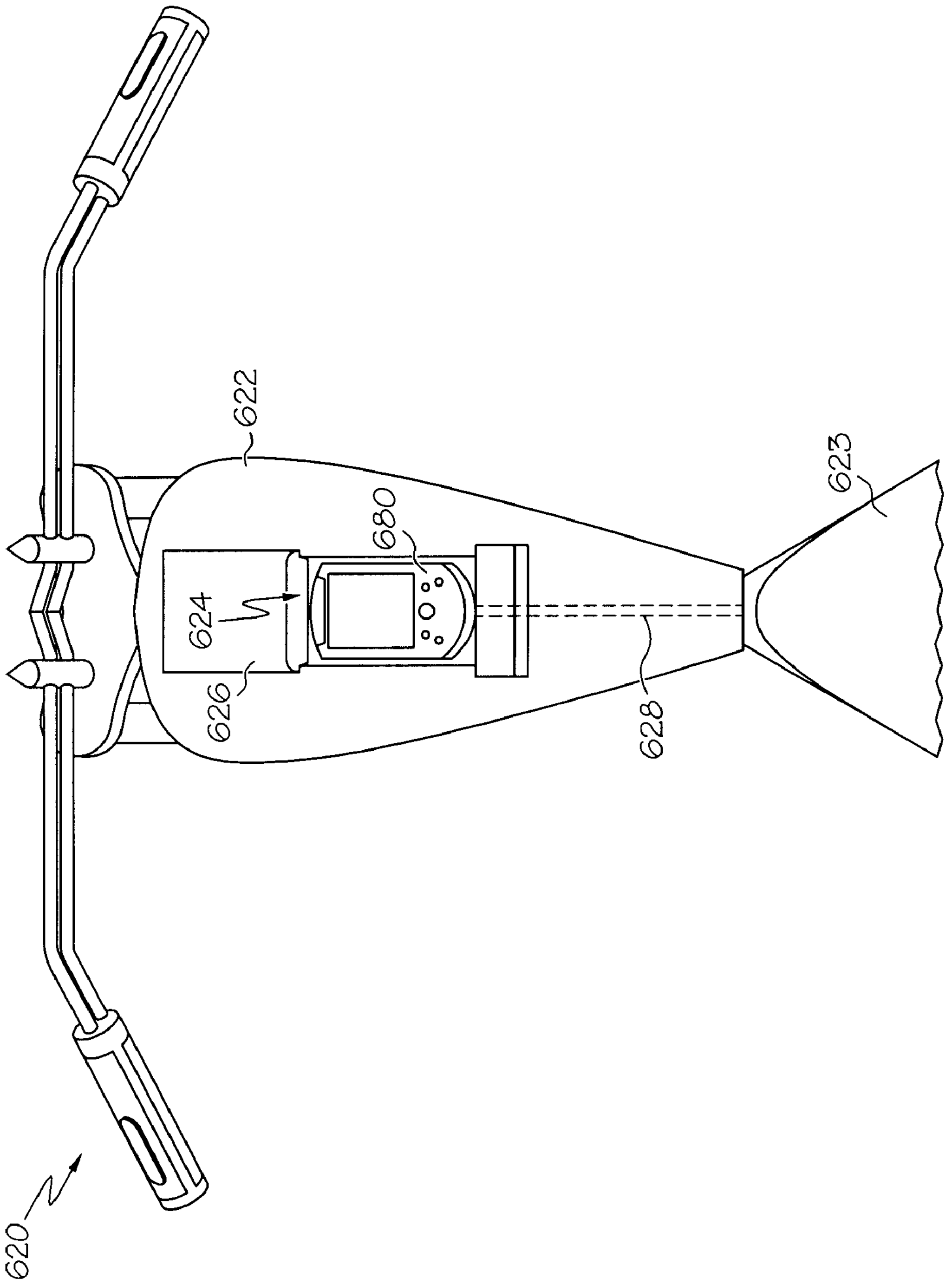
FIG. 10 depicts a partial perspective view of an embodiment of components of the system illustrated in FIG. 9, including a central display unit recessed within a gas tank of a motorcycle.
Figure 11:
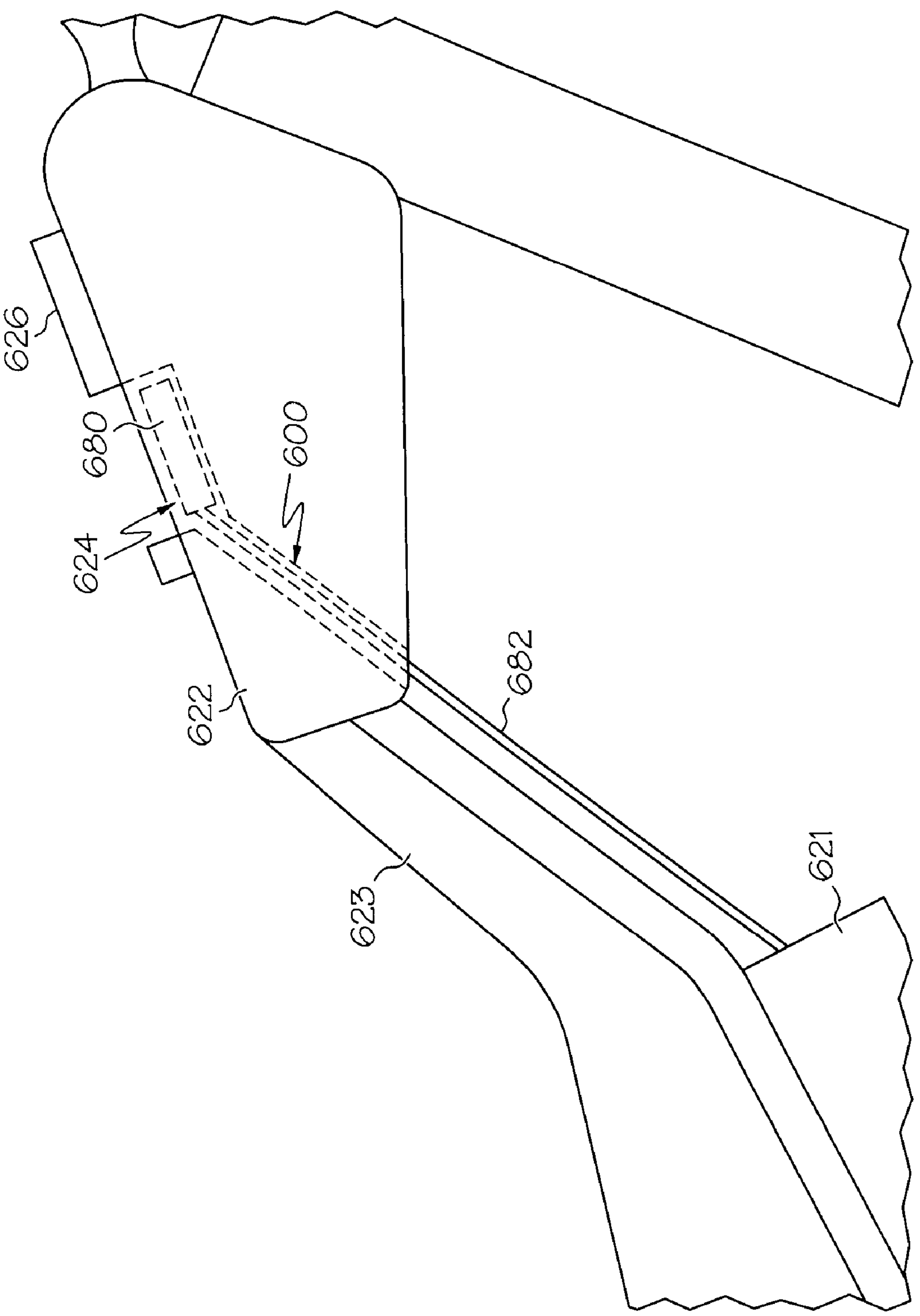
FIG. 11 depicts a partial side view of the components shown in FIG. 10.

For example, in FIGS. 10-11, where the motorized vehicle (620) is a motorcycle comprising a gas tank (622), a battery (621), and a seat (623). In the illustrated version, the gas tank (622) comprises a cavity (624), a cover (626), and a channel (628). In this example, a central display device (680) is positioned within cavity (624). The cover (626) may be capable of being positioned directly above the cavity (624), thereby protecting the contents of the cavity (624), such as the central display device (680), from the elements, such as rain, snow, heat, and cold. Alternatively, as shown in FIGS. 10-11, the cover (624) may also be maneuvered to reveal the central display device (680), thereby enabling the user to view the information received and displayed by the central display device (680).

Figure 14A:
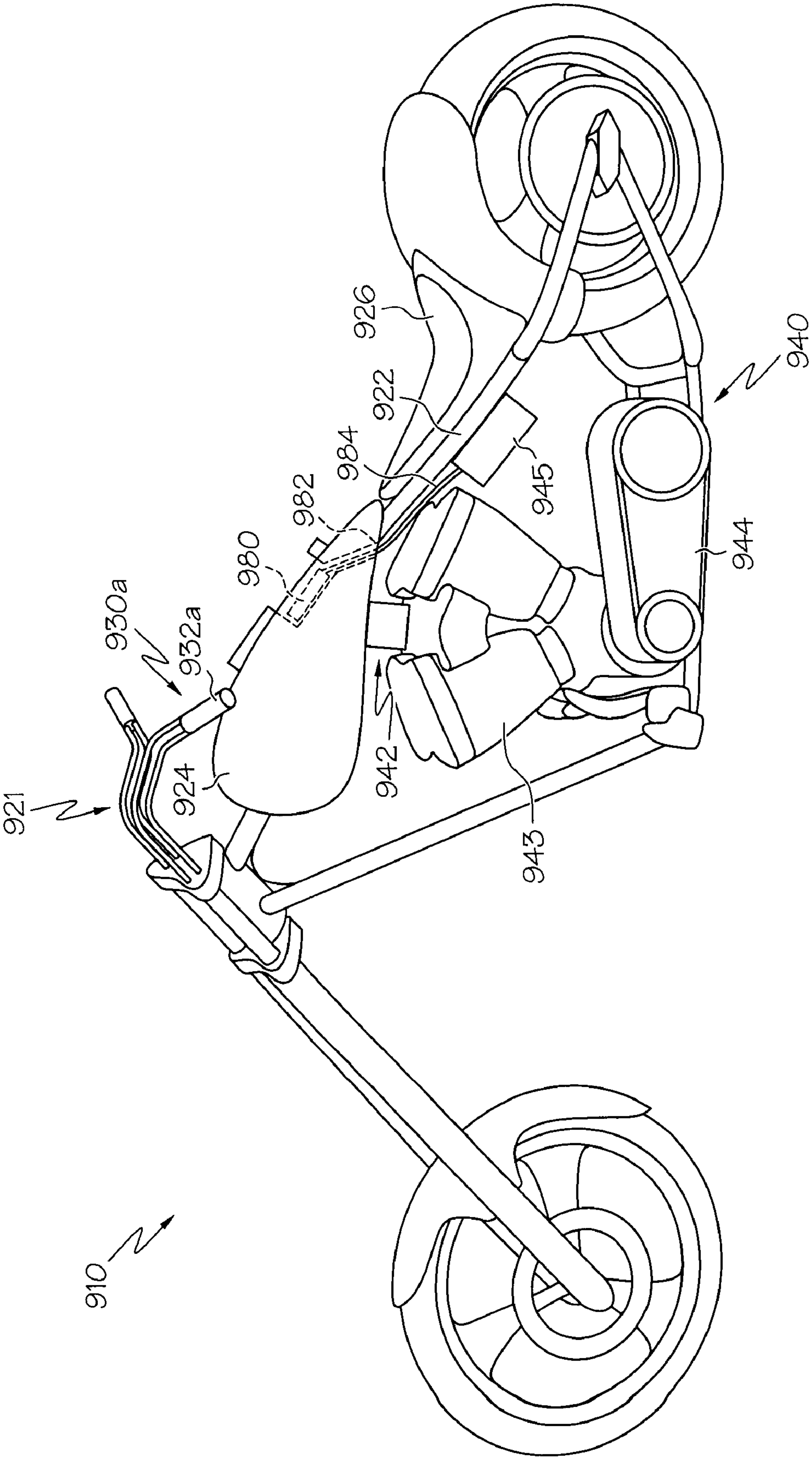

In addition, as shown in FIG. 11, the battery (621) may be mounted to the motorized vehicle (620) beneath the seat (623) (also shown in FIG. 14*a*). The battery (621) may comprise a conventional 12-volt motorcycle battery. In the present example, the channel (628) provides a pathway for a power cord (682) to run from the cavity (624) to the battery (621). In this version, the power cord (682) may connect the central display unit (680) to the battery (621), thereby providing the central display unit (680) with a constant sufficient source of power. It will be appreciated that the cavity (624) and the channel (680) may be formed within the gas tank using any suitable method.

Returning to FIG. 9, the central display unit (580) may be configured to receive a command from a user and communicate that command to the drive system (540) via the wireless communications system (550), similar to controller (30), however this is not required. The central display unit (580) may include a user interface, such as a touch screen or any other suitable device, to allow the user to input commands and/or navigate menus to view information received by the central display unit (580). As shown in FIG. 9, the system (510) comprises one central display unit (580); however, any suitable number of central display units (580) may be used.

It will be appreciated that the elimination of physical connections between the controls of a motorized device and the components of the motorized device may provide various benefits to the user. As mentioned above, the control cables connecting conventional controls to the associated mechanical components of the motorized vehicle are generally routed through the framework and other components of the motorized vehicle. It will be appreciated that it may be difficult to replace a damaged or broken control cable, because the user must not only remove the damaged or broken control cable, but he or she must also re-route the new control cable through the framework and other components of the motorized vehicle. In embodiments of the present invention, such as the handgrip assembly shown in FIGS. 3-5, instead of re-routing a new cable, the user may make repairs by removing a damaged computer chip containing the transmitter, receiver, or processing unit and inserting a replacement computer chip. It will be appreciated that a replacement protocol may be programmed into one of the components of the system, such as a central display unit or a processing unit within a controller, to facilitate the pairing and communication between the replacement computer chip and the existing components. Therefore, the cost and time required to re-route a new control cable may be eliminated by replacing the control cables with a wirelessly controlled motorized vehicle system, such as the embodiments shown in FIGS. 1-11 and described above.

In addition, as mentioned above, eliminating the control cables may allow for certain components of the motorized vehicle frame, such as the handlebars on a motorcycle, to be designed with enhanced ergonomic, aerodynamic and/or more aesthetically pleasing characteristics. Furthermore, the elimination of control cables and other physical connections may increase the customization available for motorized vehicles. Embodiments of the present invention may allow users to design unique components, rather than being required to select standard or stock components. Finally, it will be appreciated that embodiments of the present invention may facilitate maintenance and customization by providing an easily modifiable alternative to conventional control cables and other physical connections. For example, with a conventional motorcycle, when changing types of handlebars the user may be required to obtain and install a completely new control cable with a length customized to fit with the new handlebars. In various embodiments of the present invention, the user can simply remove the handgrip assembly and wireless communication components from the old handlebars and install those same components on the new handlebars, thereby reducing the cost and time associated with replacing the handlebars. These are just a few of the potential benefits of various embodiments of the present invention.

Figure 12:
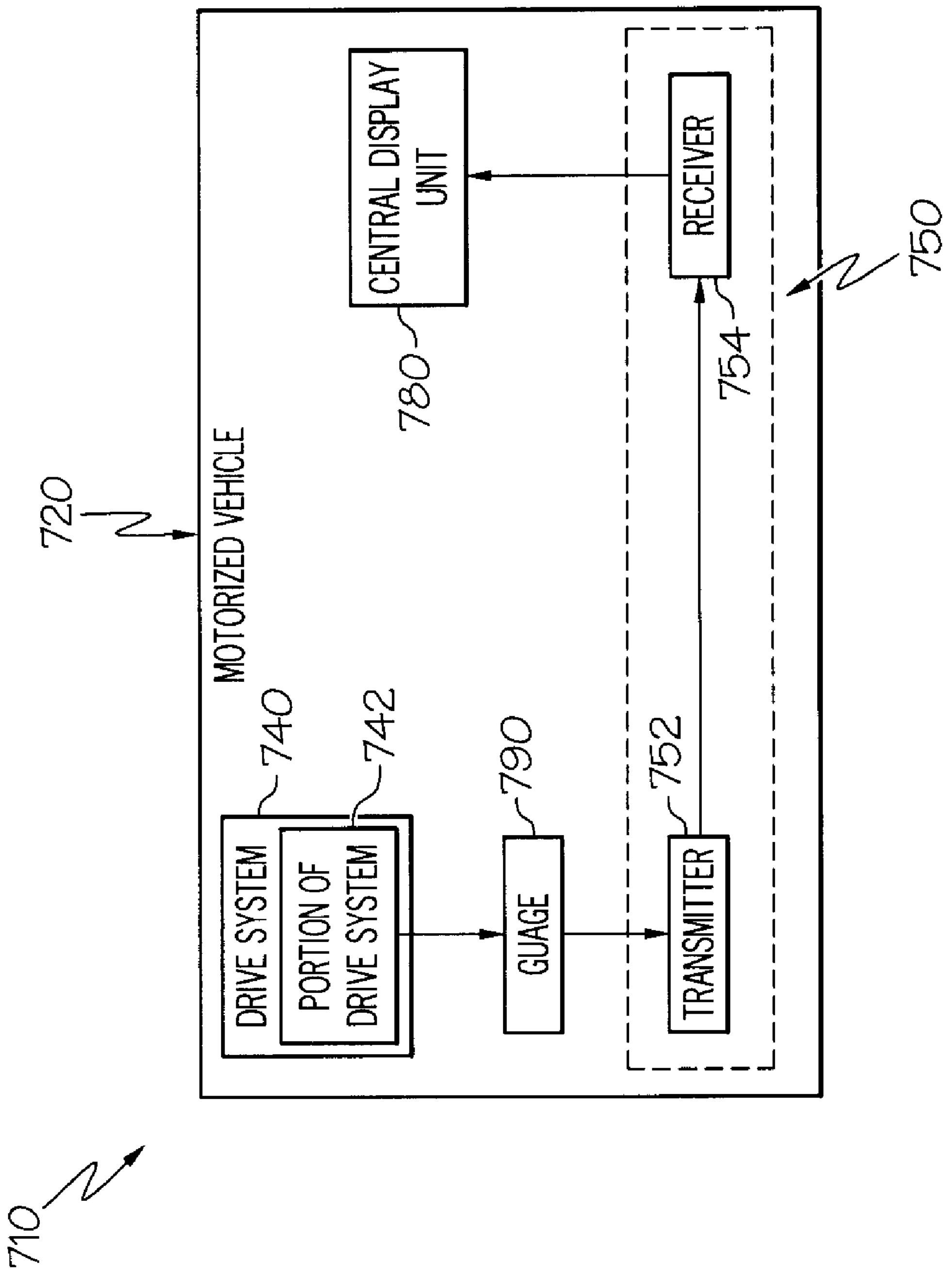
FIG. 12 is a block diagram showing an alternative wirelessly controlled motorized vehicle system including a gauge and a central display unit constructed in accordance with the present invention.

FIG. 12 depicts an alternate wirelessly controlled motorized vehicle system (710) comprising a motorized vehicle (720), a drive system (740), a gauge (790), a central display unit (780), and a wireless communications system (750). In this version, the drive system (740) comprises a portion of the drive system (742), similar to the drive system (40) and the portion of the drive system (42) described above. As shown, the wireless communications system (750) comprises a transmitter (752) and a receiver (754), which function similarly to the transmitter (52) and receiver (54) described above. It will be appreciated that the wireless communications system (750) may be powered by a battery or any other suitable power source or device.

In the present embodiment, the gauge (790) is configured to monitor the portion of the drive system (742) and collect information regarding the performance of the portion of the drive system (742). By way of example only, the gauge (790) may comprise an odometer configured to monitor the portion of the drive system (742) and collect information regarding the distance traveled by the motorized vehicle (720). In addition to an odometer, the gauge (790) may comprise a tachometer, a speedometer, or any other suitable device. It will be appreciated that, while the system (710) comprises one gauge (790) associated with one portion of the drive system (742), any suitable number of gauges and portions of the drive system may be used. The number of gauges may correspond to the number of portions of the drive system, but this is not required. In addition, the number of transmitters (752) and receivers (754) may correspond to the number of gauges (790), but this is not required.

In this version, as the gauge monitors the portion of the drive system (742) and collects information, the information is wirelessly communicated to the central display unit (780) via the wireless communications system (750). As shown, first, the information collected by the gauge is communicated to the transmitter (752) which is associated with the gauge (790). Next, the information is communicated wirelessly to the receiver (754) associated with the central display unit. Finally, in this version, the receiver (754) communicates the information to the central display unit (780), which is configured to display the information to a user.

Similar to the embodiments involving wireless communication between a controller and an associated mechanical component described above and shown in FIGS. 1-11, this embodiment involving wireless communication between a gauge and a display may provide several benefits to the user. For instance, as with conventional controls, conventional gauges are generally physically connected to the display, either by a control wire or some other physical connection. In many cases, the control wire or other physical connection must wind its way through the interior of the motor vehicle around and through the framework and other components, thereby making it difficult to replace. Replacing the physical connection with wireless communication may eliminate the time and cost required to replace such a physical connection. In addition, by eliminating the physical connections between conventional gauges and displays, it may be possible to include an increased number of gauges monitoring more portions of the motorized vehicle, including, perhaps, one or more portions of the motorized vehicle where it was previously impossible to place a gauge, thereby providing the user with more information regarding the performance of the motorized vehicle. Finally, as discussed above, embodiments of the present invention may allow fabricators to design more aesthetically appealing motorized vehicles, and increase the customization options available to users.

Figure 13:
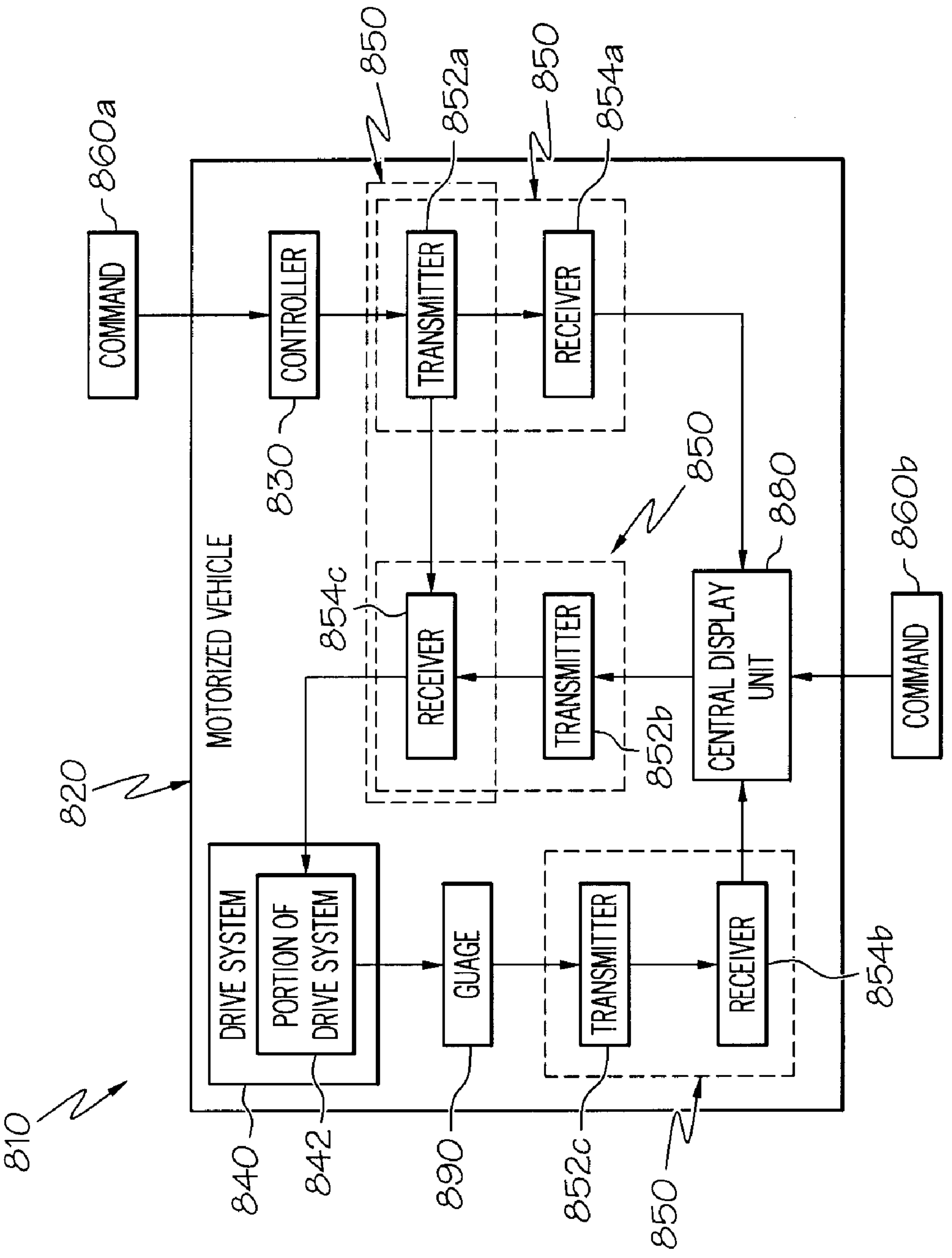
FIG. 13 is a block diagram showing an alternative wirelessly controlled motorized vehicle system including a controller, a drive system, a gauge and a central display unit constructed in accordance with the present invention.

FIG. 13 depicts an alternate wirelessly controlled motorized vehicle system (810) that is similar to the system (10) depicted in FIG. 1 and the system (710) depicted in FIG. 12. In this example, the system (810) comprises a motorized vehicle (820), a controller (830), a gauge (890), a drive system (840), a central display unit (880), and a wireless communications system (850). Similar to the drive system (40) described above, the drive system (840) comprises a portion of the drive system (842). It will be appreciated that any suitable number of controllers, portions of the drive system, gauges, and central display units may be used. It will also be appreciated that the controller (830) and the wireless communications system (850) may be powered by a battery, such as a button cell battery, or any other suitable power source or device.

The wireless communications system (850) comprises three transmitters (852 *a-c*) and three receivers (854 *a-c*). However, it will be appreciated that any suitable number of transmitters or receivers may be used. In particular, the number of transmitters and/or receivers may correspond to the number of objects that the central display unit (880) is configured to receive information from. In the system (810), both the controller (830) and the central display unit (880) are configured to receive a command (860*a*) and (860*b*), respectively, from a user, but this dual-input capability is not required. In addition to being configured to receive the command (860*b*), in the present example, the central display unit (880) is configured to display information communicated from the controller (830) to the central display unit (880) and information communicated from the portion of the drive system (842) to the central display unit (880) via the wireless communications system (850). In addition, the system (810) may comprise a manipulation device (not shown), similar to the manipulation device (370) described above, and the central display unit (880) may be configured to receive and display information regarding the movements and positioning of the manipulation device.

In the present example, the transmitter (852*a*) is configured to receive the command (860*a*) entered into the controller (830) and wirelessly communicate the command (860*a*) to either the receiver (854*c*) associated with the portion of the drive system (842) or the receiver (854*a*) associated with the central display unit (880). The controller (830) may comprise a processing unit (not shown), such as a microprocessor, a microcontroller, a parallax chip, or any other suitable device configured to determine which receiver should receive the command (860*a*). In particular, the processing unit (not shown) may comprise an 8-bit PIC based microcontroller, but this is not required. In the illustrated version, the transmitter (852*b*) is configured to receive information from the central display unit (880), such as the command (860*b*) entered by a user, and wirelessly communicate the information to the receiver (854*c*) associated with the portion of the drive system (842). In this embodiment, transmitter (852*c*) is configured to receive data regarding the portion of the drive system (842) collected by the gauge (890) and wirelessly communicate that data to the receiver (854*b*) associated with the central display unit (880). In addition, a transmitter may be configured to communicate with one receiver, such as the transmitters (852*b*) and (852*c*), with two receivers, such as the transmitter (852*a*), or with any suitable number of transmitters. Similarly, a receiver may be configured to receive signals from one transmitter, such as the receivers (854*a*) and (854*b*), from two transmitters, such as the receiver (854*c*), or from any suitable number of transmitters.

Figure 14B:
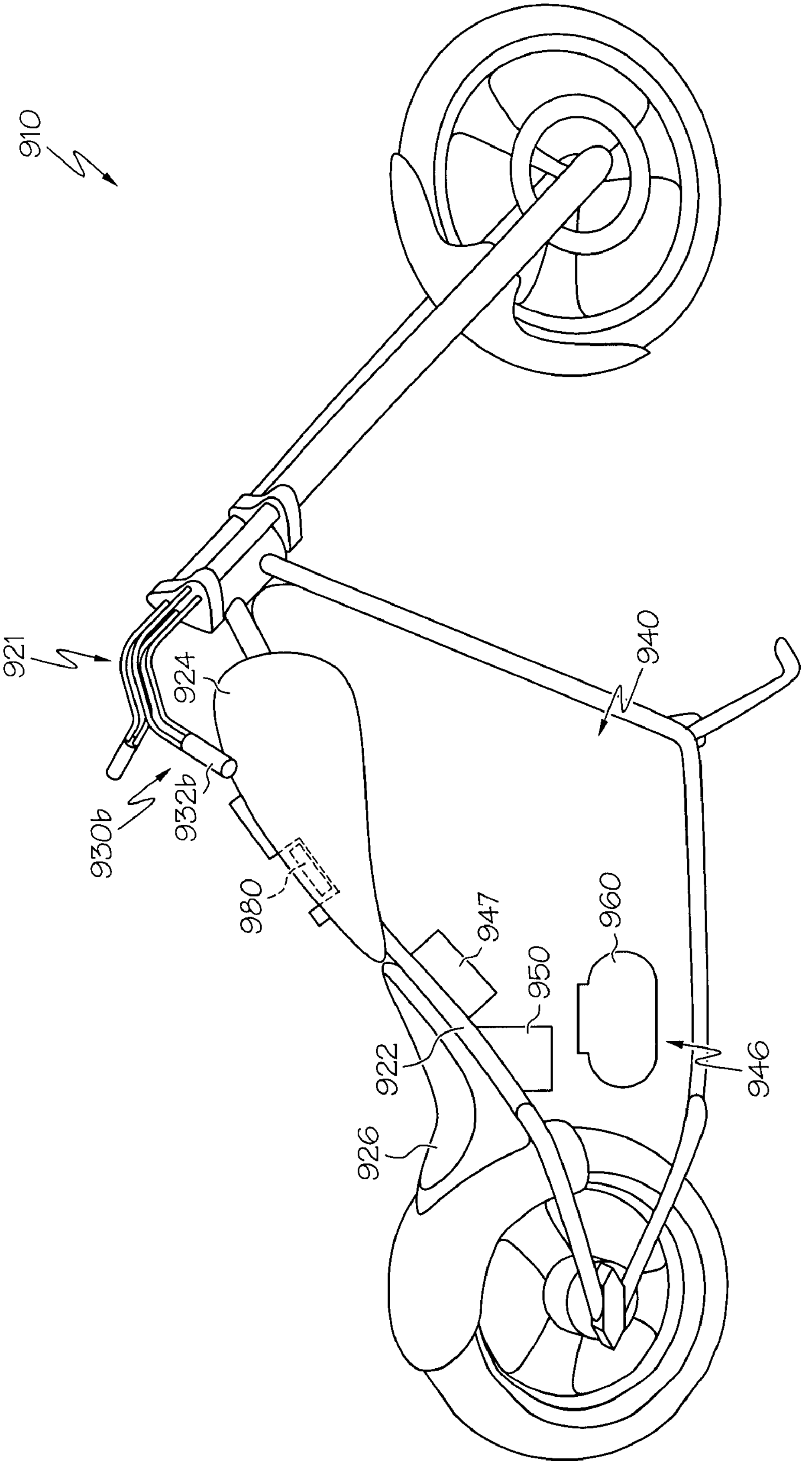

FIGS. 14*a*-14*b* depict an embodiment of a wirelessly controlled motorized vehicle system (910), wherein the motorized vehicle comprises a motorcycle (920) with multiple controllers and multiple portions of the drive system. The components of the motorcycle (920) shown in FIGS. 14*a*-14*b* include a handlebar frame (921), a body frame (922), a gas tank (924), a seat (926), and a drive system (940). In this example, the drive system (940) comprises a throttle system (942), a pair of cylinders (943), a transmission (944), a motorcycle battery (945), a clutch assembly (946), and an ignition coil (947). In addition, in the illustrated version, the system (910) comprises a first controller (930*a*) comprising a first handgrip assembly (932*a*) and a second controller (930*b*) comprising a second handgrip assembly (932*b*). The first handgrip assembly (932*a*) and the second handgrip assembly (932*b*) are similar to the handgrip assembly (240) described above and shown in FIGS. 3-5.

Similar to the gas tank (622) described above and shown in FIGS. 10-11, the gas tank (924) includes a central display unit (980) recessed within the gas tank (924). In addition, similar to the embodiment shown in FIGS. 10-11, the gas tank (924) includes a channel (982) configured to house a power cable (984) connecting the central display unit (980) to the battery (945).

As shown in FIGS. 14*a*-14*b*, the first controller (930*a*) is associated with the clutch assembly (946), which comprises a clutch cover (960), a clutch plate (not shown) and a multi-disc clutch assembly (not shown) or standard clutch used in a motorized vehicle, such as a motorcycle. Similar to the embodiment shown in FIG. 8, the first controller (930*a*) is configured to wirelessly communicate with a manipulation device (not shown) mounted to the inner surface (not shown) of the clutch cover (960). In this embodiment, a receiver (not shown) configured to receive a command input by a user by applying pressure to the first controller (930*a*) may be positioned within a compartment (950) mounted to the body frame (922) beneath the seat (926). The compartment (950) may be configured to house various electrical components, wiring, fuses, and any other suitable devices or components associated with the system (910). Similar to the embodiment shown in FIG. 8, the manipulation device (not shown) may receive power via a control wire connected to the ignition coil (947) or any other suitable power source. Finally, upon receiving the command input by the user, the manipulation device (not shown) may be configured to rotate the clutch plate (not shown) such that the clutch plate (not shown) disengages from the multi-disc clutch assembly (not shown) or standard clutch used in a motorized vehicle, such as a motorcycle.

In the illustrated version, the second controller (930*b*) is associated with the throttle system (942), wherein the throttle system comprises a carburetor (not shown) and a throttle plate (not shown). In this example, the second controller (930*b*) is configured to wirelessly communicate a command to increase the throttle to a receiver (not shown). The receiver (not shown) may be positioned within the compartment (950) or in any other suitable location. In this version, the receiver (not shown) is configured to communicate the command to a manipulation device (not shown). The manipulation device (not shown) may be mounted directly to the carburetor (not shown) or in any other suitable position, whereby the manipulation device (not shown) may be connected to the throttle plate (not shown). This embodiment may include a housing (not shown) configured to prevent damage to the manipulation device (not shown). The housing may comprise polished aluminum, but this is not required. In the present example, upon receiving the command to increase the throttle, the manipulation device (not shown) then opens up the throttle plate (not shown) to increase the throttle an amount corresponding to the amount of pressure applied by the user to the second controller (930*b*). The manipulation device (not shown) may receive power via a control wire connected to the ignition coil (947) or any other suitable power source.

FIGS. 15-17 depict a schematic view of a wireless security system (1010) which may be included with the systems (10), (310), (510), (710), and (810) described above. As shown in FIG. 15, the system (1010) comprises a motorized vehicle (1011), a main power source (1012), a main relay (1014), an ignition system (1016), an ignition relay (1018), a push button starter (1020), a starter relay (1022), a starter (1024), a relay input/output box (1030) and a key fob (1040). The main power source (1012) may comprise a conventional 12-volt battery or any other suitable device, and it may be mounted to the motorized vehicle, such as battery (945) shown in FIG. 14*a*. The ignition system (1016) may comprise a conventional ignition system, which is well known in the art. The push button starter (1020) may comprise a conventional push button starter, which is well known in the art. The starter (1024) may comprise a conventional starter, which is well known in the art.

As shown in FIG. 15, the main relay (1014) is configured to connect the relay input/output box (1030) and the ignition system (1016). When the main relay (1014) is open, then the ignition system (1016) does not receive any power from the main power source (1012). When the main relay (1014) is closed, then the ignition system (1016) receives power from the main power source (1012). The ignition relay (1018) is configured to connect the ignition system (1016) and the push button starter (1020). Similar to the main relay (1014), when the ignition relay (1018) is open, then the push button starter (1020) does not receive any power from the main power source (1012). However, when the ignition relay (1018) is closed, then the push button starter (1020) does receive power from the main power source (1012). Finally, the starter relay (1022) is configured as a momentary relay to connect the push button starter (1020) and the starter (1024). When the starter relay (1022) is open, then the starter (1024) does not receive any power from the main power source (1012). However, when the starter relay (1022) is closed, then the starter (1024) does receive power from the main power source (1012). The starter relay (1022) may be configured to be closed when the push button starter (1018) is pressed.

As shown in FIG. 16, the relay input/output box (1030) may comprise a relay (1032), a converter (1034), a wireless receiving unit (1036), and a processing unit (1038). The relay (1032) may comprise a conventional 12 volt input/output relay, which is well known in the art. The relay (1032) may be configured to allow power to flow from the main power source (1012) into the converter (1034). The converter (1034) may comprise a conventional 12 volt to 5 volt power supply converter, which is well known in the art. The converter (1034) may be configured to convert power received from the main power source (1012) to a suitable form to provide power to the wireless receiving unit (1036) and the processing unit (1038). The wireless receiving unit (1036) may comprise a BLUETOOTH™ transceiver, a ZIGBEE™ transceiver, or any other suitable device. The processing unit (1038) may comprise a microprocessor, a microcontroller, a parallax chip, or any other suitable device. In particular, the processing unit (1038) may comprise an 8-bit PIC based microcontroller.

As shown in FIG. 17, the key fob (1040) may comprise a wireless sending unit (1042), a processing unit (1044) and a power source (1046). The wireless sending unit (1042) may comprise a BLUETOOTH™ transceiver, a ZIGBEE™ transceiver, or any other suitable device. The processing unit (1044) may comprise a microprocessor, a microcontroller, a parallax chip, or any other suitable device. In particular, the processing unit (1044) may comprise an 8-bit PIC based microcontroller. In addition, the power source (1046) may comprise a battery, such as a button cell battery, or any other suitable device. The key fob (1040) may be configured to be portable, such that a user may carry the key fob (1040) on his or her person.

In the present example, the main relay (1014) is configured to be initially open. Therefore, the push button starter (1018) and the starter (1024) do not receive any power until the main relay (1014) is closed. Consequently, the motorized vehicle (1011) may not be started by the user until the main relay (1014) is closed. In the illustrated version, the wireless sending unit (1042) contained in the key fob (1040) is configured to detect the presence of the wireless receiving unit (1036) imbedded within the motorized vehicle (1011) once the key fob (1040) is positioned within a specified distance from the motorized vehicle (1011). In addition, in this example, the wireless sending unit (1042) is configured to emit a signal and a security code after detecting the presence of the wireless receiving unit (1036). The key fob (1040) may be configured to allow the user to activate and de-activate the wireless sending unit (1042), thereby preventing the wireless sending unit (1042) from emitting a signal and a security code even after detecting the presence of the wireless receiving unit (1036) until the wireless sending unit (1042) is re-activated. The security code may be randomly generated by the processing unit (1044). As shown, the wireless receiving unit (1036) is configured to detect and receive the signal and security code emitted by the wireless sending unit (1042). In this version, upon receipt of the signal and security code by the wireless receiving unit (1036), the processing unit (1038) may then verify the signal and the security code. As shown, upon verification, the main relay (1014) may be closed, thereby providing power to the ignition system (1016), the push button starter (1020), and the starter (1024). In the present example, once power is provided, then the user may start the motorized vehicle (1011).

It will be appreciated that many conventional motorized vehicles may be stolen by either copying the metal key used to turn the ignition or forcefully starting the motorized vehicle by bypassing the motorized vehicle's electrical system (i.e. hotwiring). It will also be appreciated that a wireless security system, such as the one described above and shown in FIGS. 15-17, may provide increased security due to the fact that, it is physically impossible to start the motorized vehicle until the wireless receiving unit has verified the signal and the code and closed the main relay.

It will be appreciated that, although BLUETOOTH™ protocol is preferred, all of the embodiments of the present invention described above may use any technology or protocol known within the art for wirelessly communicating signals operating at any frequency, including, but not limited to radio frequency technology.

The embodiments of the present invention described above include various methods and devices for protecting the electrical components of those embodiments. One such example includes the use of the dampening material (270) in the handgrip assembly (240) to shield the processing unit (266) and the transmitter (268) from vibrations and electrical current. Similarly, the use of a cover configured to shield electrical components from heat, cold, and moisture, such as the cover (626) shown in FIGS. 10-11, may help prevent damage to electrical components. Additionally, special components known within the art, such as a stepper motor resistant to temperatures of 150 degrees Fahrenheit or above, may also enhance the performance of embodiments of the invention. It will be appreciated that embodiments of the present invention may incorporate these methods and devices and others well known within the art to protect electrical components operating in an extreme environment, such as in a motor vehicle.

It will be appreciated that the various embodiments of the present invention described above may offer several advantages over conventional motorized vehicles. For example, in conventional motorized vehicles, such as motorcycles, generally require the frame to be drilled so that the wiring or physical connections may be routed through the frame. In embodiments of the present invention, the amount of wiring required by the motorized vehicle may be reduced, thereby resulting in a reduction of the amount of drilling done to the frame. It will be appreciated that the overall strength and structural integrity of the frame may be improved by reducing the amount of drilling done to the frame. Consequently, the user may benefit from a safety standpoint. Similarly, various embodiments of the present invention may allow for the use of a lighter weight frame for the motorized vehicle, either from the use of a thinner frame or non-conventional materials. It will be appreciated that a lighter weight frame may increase the overall safety and performance of the motorized vehicle.

Numerous benefits have been described which result from employing concepts of the invention. The foregoing description of one or more versions of the invention has been presented for purposes of illustration and description. It is not intended to be exhaustive or to limit the invention to the precise form disclosed. Obvious modifications or variations are possible in light of the above teachings. The one or more versions were chosen and described in order to best illustrate principles of the invention and its practical application to thereby enable one of ordinary skill in the art to utilize the invention in various versions and with various modifications as are suited to the particular use contemplated. It is intended that the scope of the invention be defined by the claims appended hereto.

What is claimed is:

1. A wirelessly controlled motorized vehicle system, the system comprising:

a) a motorized vehicle, the motorized vehicle comprising:

i) a drive system, wherein the drive system is operable to drive the vehicle, and ii) a controller in communication with at least a portion of the drive system, wherein the controller is integral with the motorized vehicle, wherein the controller is configured to receive a command from a user; and b) a wireless communications system, wherein the wireless communications system is in wireless communication with the drive system and the controller, wherein the wireless communications system is operable to wirelessly transmit the command input by a user via the controller to the drive system, wherein the wireless communications system comprises:

i) at least one transmitter, wherein the at least one transmitter is integral with the motorized vehicle, wherein the at least transmitter is in communication with the controller, and ii) at least one receiver, wherein the at least one receiver is integral with the motorized vehicle, wherein the at least one receiver is in communication with the portion of the drive system.

2. The system of claim 1, wherein the wireless communications system is powered by at least one battery.

3. The system of claim 1, wherein the motorized vehicle comprises a motorcycle.

4. The system of claim 1, wherein the drive system comprises at least one of a clutch assembly, a throttle system, or an ignition system.

5. The system of claim 1, wherein the portion of the drive system comprises at least one of a clutch assembly, a clutch plate, a throttle system, a throttle plate, an ignition system, or a starter.

6. The system of claim 1, wherein the controller replaces one or more of a conventional clutch handle, a conventional throttle handle, and a conventional hand shifter.

7. The system of claim 1, wherein the command comprises application of pressure to the controller by the user.

8. The system of claim 1, wherein the wireless communications system is operable to communicate via at least one of BLUETOOTH™ protocol, ZIGBEE™ protocol, or any other wireless communication protocol operating at a frequency above 2.4 GHz.

9. The system of claim 1, further comprising a manipulation device, the manipulation device being in communication with the receiver and being operable to manipulate the portion of the drive system in response to the command received by the receiver.

10. The system of claim 9, further comprising a linking member, the linking member being operable to enable the manipulation device to manipulate the portion of the drive system.

11. The system of claim 9, wherein the manipulation device comprises at least one of a servo motor or a stepper motor.

12. The system of claim 9, wherein the manipulation device comprises a stepper motor configured to operate at temperatures of about 150 degrees Fahrenheit or above.

13. The system of claim 1, wherein the at least one transmitter comprises at least one of a BLUETOOTH™ transceiver, or a ZIGBEE (TM) transceiver.

14. The system of claim 1, wherein the at least one receiver comprises at least one of a BLUETOOTH™ transceiver, or a ZIGBEE™ transceiver.

15. The system of claim 1, wherein the at least one receiver is configured to verify that the command is being transmitted by the at least one transmitter.

16. The system of claim 1, further comprising a central display unit, wherein the wireless communications system is in wireless communication with the drive system, the controller, and the central display unit, wherein the wireless communications system is operable to wirelessly transmit data from the drive system to the central display unit, and wherein the wireless communications system is operable to wirelessly transmit data from the controller to the central display unit.

17. The system of claim 16, wherein the central display unit comprises at least one of a personal digital assistant, a portable computer, a cellular telephone, or any other suitable device.

18. The system of claim 16, wherein the central display unit is operable to receive a command from a user, wherein the wireless communications system is operable to wirelessly transmit the command input by a user via the central display unit to the drive system.

19. The system of claim 16, wherein the central display unit is operable to display data received from the drive system.

20. The system of claim 16, wherein the central display unit is operable to display data received from the controller.

21. The system of claim 16, wherein the central display unit is integral with the motorized vehicle.

22. The system of claim 16, wherein the central display unit is removably attached to the motorized vehicle.

23. A wirelessly controlled motorized vehicle system, the system comprising:

a) a motorized vehicle, the motorized vehicle comprising i) a drive system, wherein the drive system is operable to drive the vehicle, and ii) a controller in communication with at least a portion of the drive system, wherein the controller is integral with the motorized vehicle, wherein the controller is configured to receive a command from a user;

b) a wireless communications system, wherein the wireless communications system is in wireless communication with the drive system and the controller, wherein the wireless communications system is operable to wirelessly transmit the command input by a user via the controller to the drive system, wherein the wireless communications system comprises i) at least one transmitter, wherein the at least one transmitter is integral with the motorized vehicle, wherein the at least transmitter is in communication with the controller, and ii) at least one receiver, wherein the at least one receiver is integral with the motorized vehicle, wherein the at least one receiver is in communication with the portion of the drive system; and c) a wireless security system, the wireless security system comprising:

i) a key fob, wherein the key fob comprises:

1. a first processing unit, the first processing unit being configured to generate a security code, 2. a wireless sending unit, the wireless sending unit being configured to emit a signal and the security code generated by the first processing unit, and 3. a power source, the power source being configured to provide power to the first processing unit and the wireless sending unit;

ii) a relay input/output box, the relay input output box comprising:

1. a relay, the relay being configured to receive power from a main power source, wherein the main power source is configured to provide power to the motorized vehicle, 2. a wireless receiving unit, the wireless receiving unit being configured to receive the signal and the security code emitted by the wireless sending unit, 3. a second processing unit, the second processing unit being configured to verify the signal and the security code upon receipt by the wireless receiving unit;

4. a converter, the converter configured to convert power received from the main power source into a form that may be used to power the wireless receiving unit and the second processing unit;

iii) an ignition system, the ignition system being configured to be connected to the relay input/output box via a main relay, wherein the main relay is configured to close upon verification by the second processing unit of the signal and security code.

24. A wirelessly controlled motorized vehicle system, the system comprising:

a) a motorized vehicle, the motorized vehicle comprising a drive system, wherein the drive system is operable to drive the motorized vehicle;

b) a gauge, wherein the gauge is configured to monitor the drive system and collect data regarding the performance of the drive system;

c) a central display unit, wherein the central display unit is associated with the motorized vehicle, wherein the central display unit is configured to display data to a user;

d) a wireless communications system, wherein the wireless communications system is in wireless communication with the gauge and the central display unit, wherein the wireless communications system is operable to wirelessly transmit the data collected by the gauge to the central display unit, wherein the wireless communications system comprises:

i) at least one transmitter, wherein the at least one transmitter is integral with the motorized vehicle, wherein the at least one transmitter is in communication with the gauge, and ii) at least one receiver, wherein the at least one receiver is integral with the motorized vehicle, wherein the at least one receiver is in communication with the central display unit.

25. The system of claim 24, wherein the motorized vehicle is a motorcycle.

26. The system of claim 24, wherein the gauge is selected from the group consisting of an odometer, a speedometer, and a tachometer.

27. A wirelessly controlled motorized vehicle system, the system comprising:

a) a motorized vehicle, the motorized vehicle comprising:

i) a drive system, wherein the drive system is operable to drive the vehicle, and ii) a controller in communication with at least a portion of the drive system, wherein the controller is integral with the motorized vehicle, wherein the controller is configured to receive a command from a user; and b) a gauge, wherein the gauge is configured to monitor the drive system and collect data regarding the performance of the drive system;

c) a central display unit, wherein the central display unit is associated with the motorized vehicle, wherein the central display unit is configured to display data to a user;

d) a wireless communications system, wherein the wireless communications system is in wireless communication with the drive system, the controller, the gauge, and the central display unit, wherein the wireless communications system is operable to wirelessly transmit the command input by a user via the controller to the drive system, wherein the wireless communications system is operable to wirelessly transmit the data collected by the gauge to the central display unit, wherein the wireless communications system comprises:

i) at least one transmitter, wherein the at least one transmitter is integral with the motorized vehicle, wherein the at least one transmitter is in communications with the controller, wherein the at least one transmitter is in communication with the gauge, and ii) at least one receiver, wherein the at least one receiver is integral with the motorized vehicle, wherein the at least one receiver is in communication with the portion of the drive system, wherein the at least one receiver is in communication with the central display unit.

28. The system of claim 27, wherein the central display unit is operable to receive a command from a user, wherein the wireless communications system is operable to wirelessly transmit the command input by a user via the central display unit to the drive system.

29. A method of wirelessly controlling a motorized vehicle comprising the steps of a) providing a motorized vehicle, wherein the motorized vehicle comprises i) a drive system, and ii) a controller in communication with at least a portion of the drive system;

b) providing a wireless communications system, wherein the wireless communications system is in wireless communication with the drive system and the controller, wherein the wireless communications system comprises:

i) at least one transmitter, wherein the at least one transmitter is integral with the motorized vehicle, wherein the at least one transmitter is in communication with the controller, and ii) at least one receiver, wherein the at least one receiver is integral with the motorized vehicle, wherein the at least one receiver is in communication with the portion of the drive system:

c) inputting a command into the controller, wherein the controller is configured to receive the command from a user;

d) communicating the command to the at least one transmitter, wherein the at least one transmitter is associated with the controller;

e) transmitting the command to the at least one receiver via the wireless communications system, wherein the at least one receiver is associated with the drive system, wherein the drive system is operable to drive the motorized vehicle;

f) communicating the command to the drive system; and g) manipulating at least a portion of the drive system in response to the command.

30. A method of wirelessly controlling a motorized vehicle comprising the steps of;

a) providing a motorized vehicle wherein the motorized vehicle comprises i)a drive system,and ii) a controller in communication with at least a portion of the drive system:

b) providing a wireless communications system, wherein the wireless communications system is in wireless communication with the drive system and the controller, wherein the wireless communications system comprises i) at least one transmitter, wherein the at least one transmitter is integral with the motorized vehicle, wherein the at least one transmitter is in communication with the controller, and ii) at least one receiver, wherein the at least one receiver is integral with the motorized vehicle, wherein the at least one receiver is in communication with the portion of the drive system;

c) inputting a command into the controller, wherein the controller is configured to receive the command from a user;

d) communicating the command to the at least one transmitter, wherein the at least one transmitter is associated with the controller;

e) transmitting the command to the at least one receiver via the wireless communications system, wherein the at least one receiver is associated with the drive system, wherein the drive system is operable to drive the motorized vehicle;

f) communicating the command to the drive system; and g) manipulating at least a portion of the drive system in response to the command; wherein the step of transmitting the command to a receiver via a wireless communications system further comprises the steps of:

i) generating a code to be transferred with the command;

ii) verifying the command based on the code; and iii) identifying the source of the command based on the code.

31. A wirelessly controlled motorized vehicle system, the system comprising:

a) a motorized vehicle, the motorized vehicle comprising i) a drive system, wherein the drive system is operable to drive the vehicle, and ii) a controller in communication with at least a portion of the drive system, wherein the controller is integral with the motorized vehicle, wherein the controller is configured to receive a command from a user; and b) a wireless communications system, wherein the wireless communications system is in wireless communication with the drive system and the controller, wherein the wireless communications system is operable to wirelessly transmit the command input by a user via the controller to the drive system, wherein the wireless communications system comprises i) at least one transmitter, wherein the at least one transmitter is integral with the motorized vehicle, wherein the at least transmitter is in communication with the controller, and ii) at least one receiver, wherein the at least one receiver is integral with the motorized vehicle, wherein the at least one receiver is in communication with the portion of the drive system;

wherein the controller comprises:

i) a force detection device, the force detection device being configured to register the amount of pressure applied by the user and create an output; and ii) a processing unit, the processing unit being configured to receive the output from the force detection device and communicate the output to the at least one transmitter.

32. The system of claim 31, wherein the processing unit comprises at least one of a microprocessor, a microcontroller, or a parallax chip.

33. The system of claim 31, wherein the force detection device comprises at least one of a pressure sensitive molecular microswitch or a thin film force detector.

34. A wirelessly controlled motorized vehicle system, the system comprising a) a motorized vehicle, the motorized vehicle comprising i) a drive system, wherein the drive sy stem is operable to drive the vehicle, and ii) a controller in communication with at least a portion of the drive system, wherein the controller is integral with the motorized vehicle, wherein the controller is configured to receive a command from a user; and b) a wireless communications system, wherein the wireless communications system is in wireless communication with the drive system and the controller, wherein the wireless communications system is operable to wirelessly transmit the command input by a user via the controller to the drive system, wherein the wireless communications system comprises i) at least one transmitter, wherein the at least one transmitter is integral with the motorized vehicle, wherein the at least transmitter is in communication with the controller, and ii) at least one receiver, wherein the at least one receiver is integral with the motorized vehicle, wherein the at least one receiver is in communication with the portion of the drive system;

wherein the controller comprises a handgrip assembly, wherein the handgrip assembly is integral with the motorized vehicle and comprises:

i) a lower portion, wherein the lower portion is configured to be attached to a portion of the motorized vehicle and comprises:

1. a rounded outer surface, 2. a flattened inner surface, wherein the flattened inner surface is configured to abut a portion of the motorized vehicle, 3. a processing unit, wherein the processing unit is configured to facilitate communication of the command from the controller to the at least one transmitter, 4. a power source, wherein the power source is configured to provide sufficient power to operate the processing unit and the at least one transmitter;
5. a component support member, wherein the component support member is configured to support the processing unit and the at least one transmitter attached thereto, and
6. a trough, wherein the trough is configured to house the component support member; and ii) an upper portion, wherein the upper portion is configured to be attached to a portion of the motorized vehicle proximate to the lower portion and comprises:

1. a rounded outer surface,
2. a flattened inner surface, wherein the flattened inner surface is configured to abut a portion of the motorized vehicle,
3. a pressure panel, wherein the pressure panel is integral with the rounded outer surface and is configured to enable the user to input the command by applying pressure on the pressure panel,
4. a cavity, wherein the cavity is configured to surround the processing unit and the transmitter when the upper portion and lower portion are attached to the portion of the motorized vehicle,
5. an aperture, wherein the aperture is in the flattened inner surface and positioned proximate to the pressure panel, and
6. a force detection device, wherein the force detection device is configured to be inserted through the aperture and positioned proximate to the pressure panel, such that the force detection device may detect the command input by the user, wherein the force detection device is in communication with the processing unit, such that the command may be communicated to the processing unit and, subsequently, to the at least one transmitter.

35. The system of claim 34, wherein the cavity further comprises dampening material, wherein the dampening material is configured to reduce vibrations within the cavity, stabilize the processing unit and the at least one transmitter, and block current running through the portion of the motorized vehicle from reaching the processing unit and the at least one transmitter.

36. The system of claim 35, wherein the dampening material comprises static resistant rubber foam.

37. The system of claim 34, wherein the power source comprises a button cell battery.

38. The system of claim 34, wherein the force detection device comprises at least one of a pressure sensitive molecular microswitch or a thin film force detector.

39. The system of claim 34, wherein the processing unit comprises at least one of a microprocessor, a microcontroller, or a parallax chip.

* * * * *